United States Patent
Kakaiya et al.

(10) Patent No.: US 11,656,916 B2
(45) Date of Patent: May 23, 2023

(54) HIGH-PERFORMANCE INPUT-OUTPUT DEVICES SUPPORTING SCALABLE VIRTUALIZATION

(71) Applicant: Intel Corporation, Santa Clara, CA (US)

(72) Inventors: Utkarsh Y. Kakaiya, Folsom, CA (US); Rajesh Sankaran, Portland, OR (US); Sanjay Kumar, Hillsboro, OR (US); Kun Tian, Shanghai (CN); Philip Lantz, Cornelius, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/361,932

(22) Filed: Jun. 29, 2021

(65) Prior Publication Data

US 2022/0027207 A1 Jan. 27, 2022

Related U.S. Application Data

(63) Continuation of application No. 16/351,396, filed on Mar. 12, 2019, now Pat. No. 11,055,147, which is a
(Continued)

(51) Int. Cl.
*G06F 9/50* (2006.01)
*G06F 15/76* (2006.01)
(Continued)

(52) U.S. Cl.
CPC .......... *G06F 9/5077* (2013.01); *G06F 9/5038* (2013.01); *G06F 15/76* (2013.01);
(Continued)

(58) Field of Classification Search
CPC ...... G06F 9/5077; G06F 9/5038; G06F 15/17; H04L 51/26
See application file for complete search history.

(56) References Cited

U.S. PATENT DOCUMENTS

| 4,943,913 A | 7/1990 | Clark |
| 6,600,493 B1 | 7/2003 | Sethi et al. |

(Continued)

OTHER PUBLICATIONS

"PCI-SIG SR-IOV Primer," Revision 2.5, Intel Corporation, Jan. 2011, https://www-ssl.intel.com/content/dam/doc/application-note/pci-sig-sr-iov--primer-sr-iov-technology-paper.pdf, 28 pages.
(Continued)

*Primary Examiner* — Jimmy H Tran
(74) *Attorney, Agent, or Firm* — Nicholson De Vos Webster & Elliott LLP

(57) ABSTRACT

Techniques for scalable virtualization of an Input/Output (I/O) device are described. An electronic device composes a virtual device comprising one or more assignable interface (AI) instances of a plurality of AI instances of a hosting function exposed by the I/O device. The electronic device emulates device resources of the I/O device via the virtual device. The electronic device intercepts a request from the guest pertaining to the virtual device, and determines whether the request from the guest is a fast-path operation to be passed directly to one of the one or more AI instances of the I/O device or a slow-path operation that is to be at least partially serviced via software executed by the electronic device. For a slow-path operation, the electronic device services the request at least partially via the software executed by the electronic device.

18 Claims, 17 Drawing Sheets

Related U.S. Application Data continuation of application No. 15/584,979, filed on May 2, 2017, now Pat. No. 10,228,981.

(51) Int. Cl.
*H04L 51/226* (2022.01)
*G06F 15/17* (2006.01)
*H04L 67/2885* (2022.01)
*H04L 61/59* (2022.01)

(52) U.S. Cl.
CPC ........... *H04L 51/226* (2022.05); *G06F 15/17* (2013.01); *H04L 61/59* (2022.05); *H04L 67/2885* (2013.01); *H04T 2001/2093* (2013.01)

(56) References Cited

U.S. PATENT DOCUMENTS

| | | | |
|---|---|---|---|
| 6,718,361 B1 | 4/2004 | Basani et al. | |
| 7,124,170 B1 | 10/2006 | Sibert | |
| 7,725,305 B2 | 5/2010 | Taillefer et al. | |
| 8,060,722 B2 | 11/2011 | Adams et al. | |
| 8,392,623 B2 | 3/2013 | Subramanian et al. | |
| 8,473,947 B2 | 6/2013 | Goggin et al. | |
| 8,533,713 B2 | 9/2013 | Dong | |
| 8,600,126 B2 | 12/2013 | Morita | |
| 8,600,726 B1 | 12/2013 | Varshney et al. | |
| 8,607,253 B2 | 12/2013 | Oshins | |
| 8,719,817 B2 | 5/2014 | Aswani et al. | |
| 8,856,789 B2 | 10/2014 | Torrey | |
| 9,213,557 B2 | 12/2015 | Dubinsky | |
| 9,213,567 B2 | 12/2015 | Barde | |
| 9,424,199 B2 | 8/2016 | Kegel et al. | |
| 9,471,494 B2 | 10/2016 | Sankaran et al. | |
| 9,519,781 B2 | 12/2016 | Golshan et al. | |
| 9,645,766 B1 | 5/2017 | Lecrone | |
| 9,645,939 B2 | 5/2017 | Dulloor et al. | |
| 9,842,055 B2 | 12/2017 | Eddy et al. | |
| 9,880,867 B2 | 1/2018 | Delco | |
| 9,952,987 B2 | 4/2018 | Guddeti et al. | |
| 9,996,484 B1* | 6/2018 | Davis | G06F 13/105 |
| 10,007,619 B2 | 6/2018 | Podaima et al. | |
| 10,013,388 B1* | 7/2018 | Wang | G06F 13/20 |
| 10,095,444 B1 | 10/2018 | Lecrone | |
| 10,489,302 B1* | 11/2019 | Habusha | G06F 12/1009 |
| 10,635,499 B2 | 4/2020 | Huynh | |
| 2003/0018876 A1 | 1/2003 | Zahir et al. | |
| 2003/0188122 A1 | 10/2003 | Bennett et al. | |
| 2004/0010788 A1 | 1/2004 | Cota-Robles et al. | |
| 2006/0069899 A1 | 3/2006 | Schoinas et al. | |
| 2006/0075146 A1 | 4/2006 | Schoinas et al. | |
| 2006/0112219 A1 | 5/2006 | Chawla et al. | |
| 2006/0206687 A1* | 9/2006 | Vega | G06F 12/145 |
| | | | 711/6 |
| 2007/0288228 A1 | 12/2007 | Taillefer et al. | |
| 2008/0005297 A1* | 1/2008 | Kjos | H04L 67/08 |
| | | | 709/223 |
| 2008/0127233 A1 | 5/2008 | Neil et al. | |
| 2008/0288661 A1* | 11/2008 | Galles | G06F 13/10 |
| | | | 710/3 |
| 2010/0042776 A1 | 2/2010 | Seo et al. | |
| 2010/0161847 A1* | 6/2010 | Riddoch | G06F 12/145 |
| | | | 710/22 |
| 2011/0022818 A1 | 1/2011 | Kegel et al. | |
| 2011/0179214 A1 | 7/2011 | Goggin et al. | |
| 2011/0179413 A1 | 7/2011 | Subramanian et al. | |
| 2011/0179414 A1 | 7/2011 | Goggin et al. | |
| 2011/0197003 A1 | 8/2011 | Serebrin et al. | |
| 2011/0239213 A1 | 9/2011 | Aswani et al. | |
| 2011/0296411 A1* | 12/2011 | Tang | G06F 9/45545 |
| | | | 718/1 |
| 2012/0084487 A1* | 4/2012 | Barde | G06F 9/45541 |
| | | | 711/6 |
| 2012/0166690 A1 | 6/2012 | Regula | |
| 2012/0167082 A1 | 6/2012 | Kumar et al. | |
| 2012/0239832 A1 | 9/2012 | Subramanian et al. | |
| 2012/0246381 A1 | 9/2012 | Kegel et al. | |
| 2012/0254862 A1 | 10/2012 | Dong | |
| 2012/0324442 A1* | 12/2012 | Barde | H04L 49/70 |
| | | | 718/1 |
| 2013/0067501 A1 | 3/2013 | Oshins | |
| 2013/0080714 A1 | 3/2013 | Kegel et al. | |
| 2013/0117848 A1 | 5/2013 | Golshan et al. | |
| 2013/0138840 A1* | 5/2013 | Kegel | G06F 12/1081 |
| | | | 710/22 |
| 2013/0145051 A1* | 6/2013 | Kegel | G06F 13/28 |
| | | | 710/9 |
| 2013/0145055 A1* | 6/2013 | Kegel | G06F 12/0223 |
| | | | 710/26 |
| 2013/0275715 A1 | 10/2013 | Caprioli et al. | |
| 2013/0305246 A1 | 11/2013 | Goggin et al. | |
| 2014/0068137 A1* | 3/2014 | Kegel | G06F 12/1081 |
| | | | 711/6 |
| 2015/0160960 A1 | 6/2015 | Delco | |
| 2015/0178202 A1 | 6/2015 | Sankaran et al. | |
| 2015/0242227 A1 | 8/2015 | Nair | |
| 2015/0269004 A1 | 9/2015 | Gainey et al. | |
| 2015/0319250 A1 | 11/2015 | Vasudevan et al. | |
| 2016/0077847 A1 | 3/2016 | Hunter et al. | |
| 2016/0077858 A1 | 3/2016 | Hunter et al. | |
| 2016/0077884 A1 | 3/2016 | Hunter et al. | |
| 2016/0147679 A1 | 5/2016 | Guddeti et al. | |
| 2016/0188390 A1* | 6/2016 | Nelson | G06F 9/45504 |
| | | | 719/312 |
| 2016/0350234 A1 | 12/2016 | Podaima et al. | |
| 2016/0378672 A1 | 12/2016 | Dulloor et al. | |
| 2017/0083360 A1 | 3/2017 | Adams et al. | |
| 2017/0097835 A1 | 4/2017 | Tzen et al. | |
| 2017/0199827 A1 | 7/2017 | Sankaran et al. | |
| 2017/0228233 A1 | 8/2017 | Mishaeli et al. | |
| 2017/0277573 A1 | 9/2017 | Huynh | |
| 2017/0286302 A1 | 10/2017 | Roy et al. | |
| 2017/0353394 A1 | 12/2017 | Brandwine et al. | |
| 2017/0364377 A1 | 12/2017 | Koller et al. | |
| 2018/0004562 A1 | 1/2018 | Huntley et al. | |
| 2018/0101494 A1* | 4/2018 | Davis | G06F 13/385 |
| 2018/0189104 A1 | 7/2018 | Agarwal et al. | |
| 2018/0321985 A1 | 11/2018 | Kakaiya et al. | |
| 2019/0108106 A1 | 4/2019 | Aggarwal et al. | |
| 2019/0115989 A1 | 4/2019 | Rodriguez-Herrera et al. | |
| 2019/0361728 A1 | 11/2019 | Kumar et al. | |
| 2019/0370050 A1 | 12/2019 | Kumar et al. | |
| 2019/0391937 A1 | 12/2019 | Cooray et al. | |
| 2020/0019349 A1* | 1/2020 | Franke | G06F 9/45558 |
| 2020/0050480 A1 | 2/2020 | Cao et al. | |
| 2020/0117624 A1 | 4/2020 | Kumar et al. | |
| 2020/0150987 A1 | 5/2020 | Nair | |
| 2020/0272502 A1 | 8/2020 | Hiltgen et al. | |
| 2020/0403940 A1 | 12/2020 | Daly et al. | |
| 2020/0412803 A1 | 12/2020 | Tasoulas et al. | |
| 2021/0255882 A1* | 8/2021 | Nair | G06F 9/461 |
| 2022/0058041 A1* | 2/2022 | Nair | G06F 13/28 |
| 2022/0334982 A1* | 10/2022 | Cooray | G06F 13/16 |

OTHER PUBLICATIONS

Agarwal S., et al., "Scalable Network Path Emulation," 13th IEEE International Symposium on Modeling, Analysis, and Simulation of Computer and Telecommunication Systems, Sep. 2005, 10 pages.

Ahrenholz J., et al., "Core: A Real-Time Network Emulator," Military Communications Conference 2008, MILCOM 2008, Nov. 2008, 7 pages.

Allowance Decision of Examination, TW App. No. 105140268, dated Nov. 26, 2020, 3 pages (1 page of English Translation and 2 pages of Original Document).

Elgebaly M., et al., "Efficient Adaptive Voltage Scaling System Through On-Chip Critical Path Emulation," Proceedings of the 2004 International Symposium on Low Power Electronics and Design, Aug. 2004, ISLPED'04, pp. 375-380.

Final Office Action from U.S. Appl. No. 14/994,393, dated Aug. 11, 2017, 18 pages.

(56) References Cited

OTHER PUBLICATIONS

Final Office Action, U.S. Appl. No. 16/351,396, dated Dec. 1, 2020, 10 pages.
International Preliminary Report on Patentability for Application No. PCT/US2016/066375, dated Jul. 26, 2018, 12 pages.
International Search Report and Written Opinion for Application No. PCT/US2016/066375, dated Mar. 29, 2017, 11 pages.
Mihocka D., et al., "Virtualization Without Direct execution or Jilting: Designing a Portable Virtual Machine Infrastructure," 1st Workshop on Architectural and Microarchitectural Support for Binary Translation in ISCA-35, Beijing, 2008, 16 pages.
Non-Final Office Action, U.S. Appl. No. 16/351,396, dated Jul. 2, 2020, 7 pages.
Non-Final Office Action, U.S. Appl. No. 14/994,393, dated Apr. 7, 2017, 12 pages.
Notice of Allowance from U.S. Appl. No. 15/584,979, dated Oct. 24, 2018, 15 pages.
Notice of Allowance, U.S. Appl. No. 14/994,393, dated Oct. 25, 2019, 3 pages.
Notice of Allowance, U.S. Appl. No. 16/351,396, dated Mar. 10, 2021, 8 pages.
Office Action, TW App. No. 105140268, dated Aug. 31, 2020, 12 pages (6 pages of English Translation and 6 pages of Original Document).
Single Root I/O Virtualization and Sharing Specification Revision 1.0, PCI-SIG, Sep. 11, 2007, https://pcisig.com/specifications/iov/, 84 pages.
Waldspurger C., et al., "I/O Virtualization," Communications of the ACM, Jan. 2012, vol. 55 (1), pp. 66-72.

\* cited by examiner

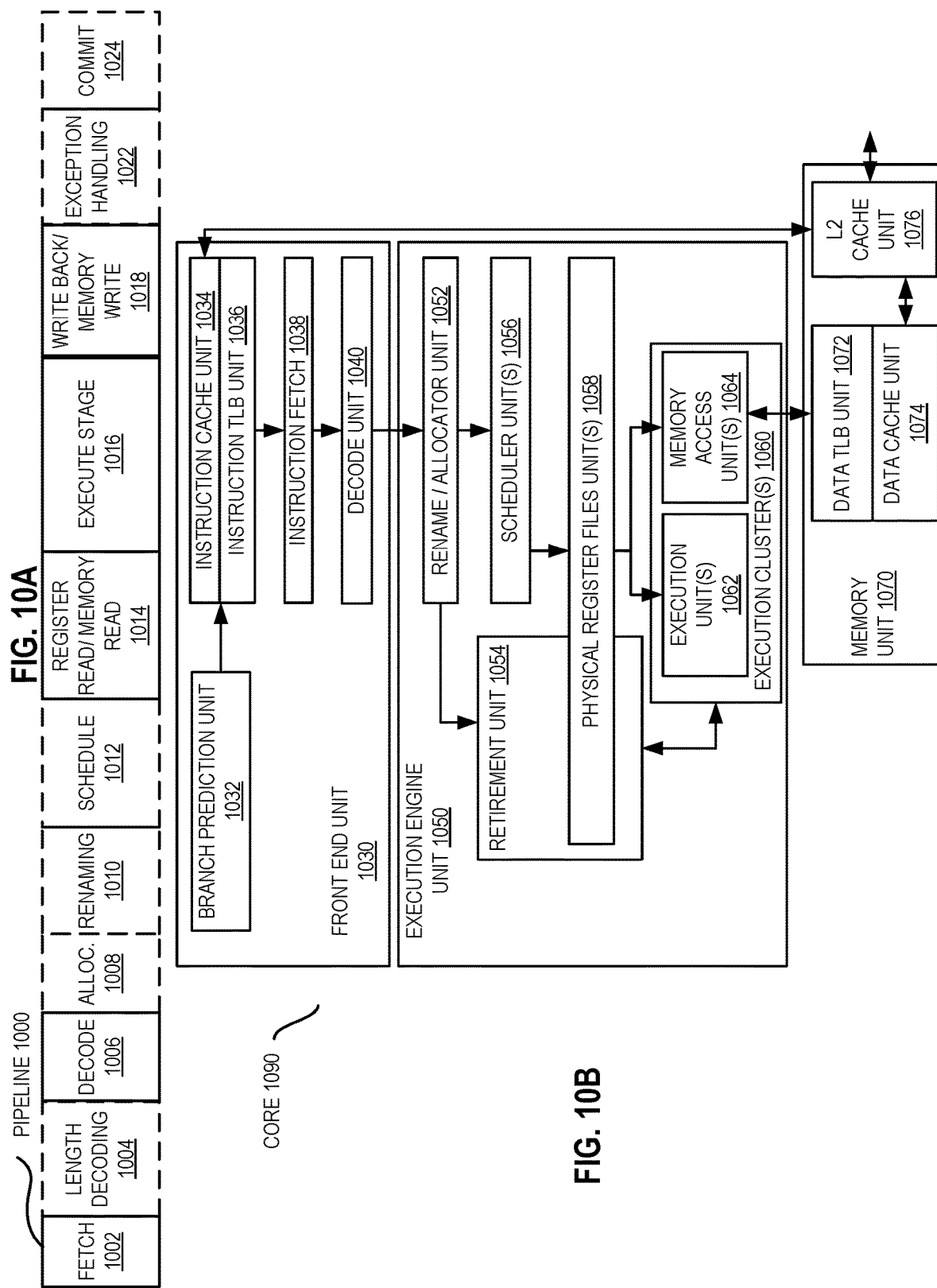

HIGH-PERFORMANCE INPUT-OUTPUT DEVICES SUPPORTING SCALABLE VIRTUALIZATION

TECHNICAL FIELD

The disclosure relates generally to electronic systems and information processing, and, more specifically, embodiments relate to high-performance input-output devices supporting scalable virtualization.

BACKGROUND

The technique of virtualization in information processing systems allows multiple instances of one or more operating systems (OSs) to run on a single information processing system (or "server end station"), even though each OS is designed to have complete, direct control over the system and its resources. Virtualization is typically implemented by using software such as a Virtual Machine Monitor (VMM) (or hypervisor) to present to each OS a virtual machine (VM) having virtual resources, including one or more virtual processors, that the OS may completely and directly control, while the VMM maintains a system environment for implementing virtualization policies such as sharing and/or allocating the physical resources between the VMs.

Additional types of resources that can be virtualized may include input/output (I/O) devices, where I/O devices could be controllers (e.g., bus, interconnect, and/or fabric controllers, network interface controllers (NICs), etc.), processors/accelerators (e.g., graphics processors, cryptographic accelerators, compression accelerators), and any other resources that may be addressed in the system. Various approaches to virtualization regarding I/O devices have been and continue to be developed in which I/O devices may be used and/or shared at various times by various numbers of VMs or containers.

A relatively recent development in the field of virtualization relates to the use of containers. Containers provide a mechanism to pre-package applications with underlying software package dependencies and execute them in isolated environments similar to traditional virtualization. Containers promise less overhead (and hence, allow for more density for deployments) than traditional virtual machines, and are increasingly used in hyper-scale configurations by datacenters and cloud service providers. Because containers are lightweight and incur less overhead compared to traditional VMs, they are often deployed in high densities (i.e., with many containers being executed at a particular server end station) and require provisioning of resources—including input/output (I/O) resources—at finer granularity and larger scale.

For example, recent datacenter deployment trends have shown that in many cases typical high-volume server platforms are being used to host an order of magnitude more containers than what was previously done with traditional VMs—e.g., 1000+ container instances versus 100+VM instances. This heavy containerized usage, along with the use of high-performance I/O devices and accelerators (for I/O and compute acceleration) by emerging scale-out workloads, pushes the demand for scalable and finer grained virtualization of I/O than typically required by more traditional virtualization usages.

Accordingly, techniques for enabling scalable and/or finer-grained virtualization of I/O in devices providing containerization and/or virtualization services are strongly desired.

BRIEF DESCRIPTION OF THE DRAWINGS

The invention may best be understood by referring to the following description and accompanying drawings that are used to illustrate some embodiments. In the drawings:

FIG. 10A is a block diagram illustrating both an exemplary in-order pipeline and an exemplary register renaming, out-of-order issue/execution pipeline according to some embodiments.

FIG. 10B is a block diagram illustrating both an exemplary embodiment of an in-order architecture core and an exemplary register renaming, out-of-order issue/execution architecture core to be included in a processor according to some embodiments.

FIG. 11A is a block diagram of a single processor core, along with its connection to the on-die interconnect network 1102 and with its local subset of the Level 2 (L2) cache 1104, according to some embodiments.

FIG. 11B is an expanded view of part of the processor core in FIG. 11A according to some embodiments.

FIGS. 13-16 are block diagrams of exemplary computer architectures, in which:

FIG. 13 shown a block diagram of a system according to some embodiments.

FIG. 14 is a block diagram of a first more specific exemplary system according to some embodiments.

FIG. 15 is a block diagram of a second more specific exemplary system according to some embodiments.

FIG. 16 is a block diagram of a SoC according to some embodiments.

DETAILED DESCRIPTION

Figure 1:
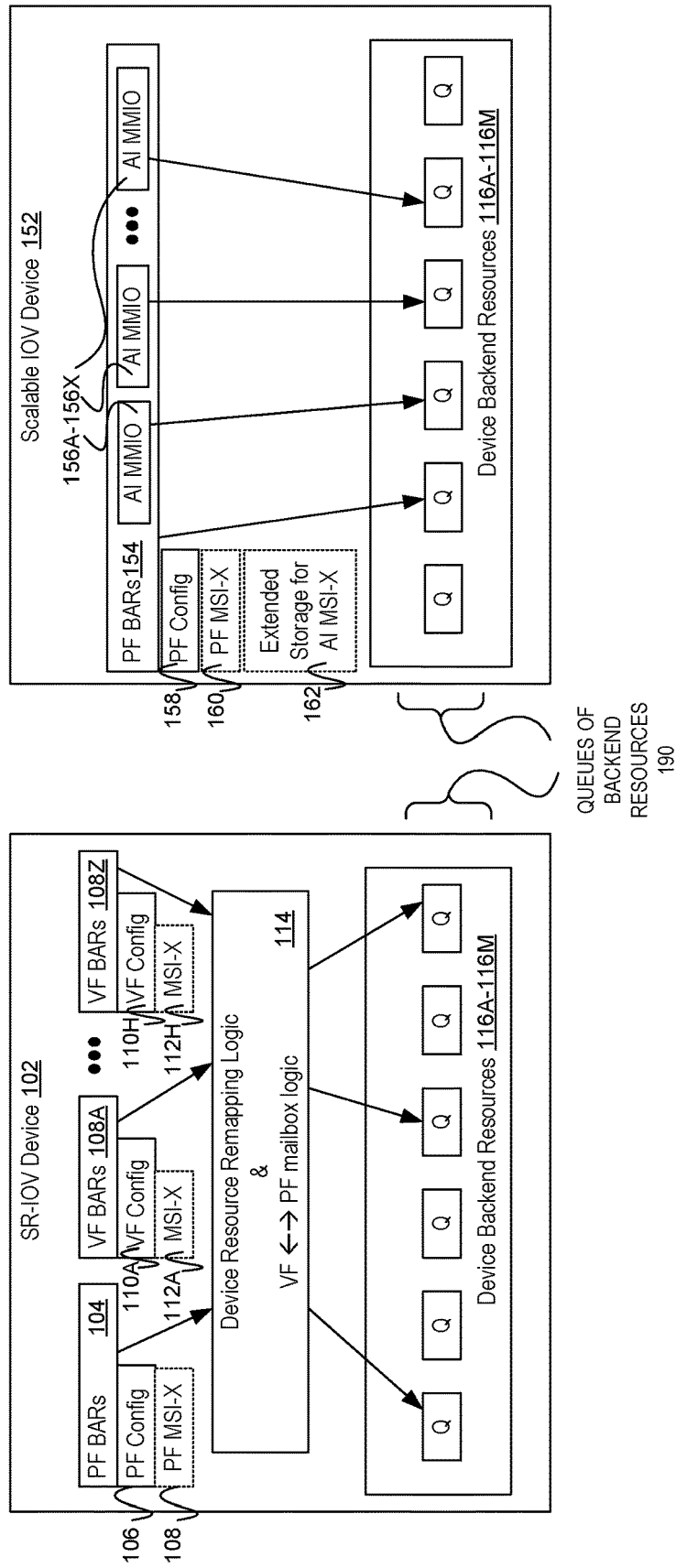
FIG. 1 is a block diagram illustrating an existing device architecture adhering to the SR-IOV specification and a Scalable IOV device architecture according to some embodiments.

The following description describes methods, apparatuses, computer-readable media, and systems for implementing high-performance input-output devices supporting scalable virtualization. In this description, numerous specific details such as logic implementations, types and interrelationships of system components, etc., may be set forth in order to provide a more thorough understanding of some embodiments. It will be appreciated, however, by one skilled in the art that the invention may be practiced without such specific details. In other instances, control structures, gate level circuits, and/or full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used in the Figures to illustrate optional operations that add additional features to some embodiments. However, such notation should not be taken to mean that these are the only options or optional operations, and/or that blocks with solid borders are not optional in certain embodiments.

Moreover, reference numerals with suffix letters (e.g., 110A-110H, 156A-156X) may be used to indicate that there can be multiple instances of the referenced entity in some embodiments, though these multiple instances do not need to be identical and may instead share some general traits or act in one or more common ways. Further, the particular suffixes used are not meant to imply that a particular amount of the entity exists unless specifically indicated to the contrary. For example, in many embodiments there may be more AI MMIO 156A-156X instances than VF configuration space 110A-110H instances; however, this trait is not mandatory and other embodiments can have differing numbers of these instances, such as a scenario where there are fewer AI MMIO 156A-156X than VF configuration space 110A-110H instances.

Additionally, in some cases the use of lines with dashed borders may be used to simply assist the reader in differentiating between the paths of these lines, such as where many lines are shown in a small region of space. Thus, a solid line, dotted line, and dashed line could be used for three adjacent lines to assist the reader in visually identifying the different paths/routes of these lines. Thus, depending upon the context of use, the use of dashes lines may or may not indicate optional operations/features, and may simply provide visual assistance in comprehending that which is disclosed.

Embodiments disclosed herein provide architectures (or "blueprints" of architectures) for virtualizing high-performance input/output (I/O) devices at a scale (and cost) that is not achievable with current Single Root I/O Virtualization (SR-IOV) approaches. Embodiments described here enable device vendors to build I/O devices that meet the growing need of hardware acceleration in high-density and hyper-scale configurations while keeping existing guest software investments.

Currently, accelerator devices and high performance I/O devices can be virtualized through the SR-IOV architecture as defined by the Peripheral Component Interconnect Special Interest Group (PCI-SIG), which provides extensions to the PCI Express (PCIe) specification suite to enable multiple system images or guests to directly access subset portions of physical I/O resources. SR-IOV specifies that a device is to have one or more physical functions (PFs)—which can be standard PCIe functions—and zero, one, or multiple virtual functions (VFs) such that each VF can be assigned to a software domain (VM) independently. Each VF is assigned a unique Requester ID (e.g., a Bus/Device/Function (or "B/D/F") number) to index an I/O Memory Management Unit (IOMMU) page table for translation purposes. Further, each VF can be assigned Memory Mapped I/O (MMIO) regions, Message Signaled Interrupts (MSIs) and its extension (MSI-X) tables, etc. The replication of these front-end resources allows VMs to submit work and get results back (i.e., fast-path communication) without any—or with very limited—involvement from the underlying Virtual Machine Monitor (VMM). Due to the tremendous complexity and costs associated with building a large number of VFs, most device manufacturers support VFs in the range of 10s to 100s.

Another deployment trend is the increasing demand for nested virtualization, leading to the increased need to efficiently support hardware I/O virtualization in such nested configurations.

As one example, in pure nested virtualization (e.g., a L1-VMM within a L0-VM), the L1-VMM uses the same hardware I/O virtualization capability on assigned VFs to enable efficient I/O virtualization for L1-VMs as that which is being used by L0-VMM on PF.

As another example, in running multiple containers within a VM, the O/S within the VM provides direct access to assigned VFs from multiple high-priority containers for best efficiency.

As another example, in multi-hosting shared I/O, a managed multi-host capable PCI-Express switch (along with a management central processing unit (CPU)) synthesizes a virtual hierarchy per host, and exposes each SR-IOV VF on endpoints behind the managed switch as individual PFs on that virtual hierarchy to avoid the uncommon Multi-Root I/O Virtualization (MR-IOV) implementation.

Despite the success of containerized deployments, these deployments cannot effectively utilize hardware acceleration because of the limited scalability of device hardware, the inability to support nested hardware I/O virtualization, and the limited availability of platform resources (e.g., B/D/F numbers). In many scenarios, the restrictions imposed by the SR-IOV specification limit the adoption of re-configurable hardware, such as field-programmable gate array (FPGA) based accelerators, in the cloud.

For example, many challenges exist within the context of the SR-IOV specification that limit the adoption of hardware acceleration in containerized deployments.

One challenge regards nested hardware I/O virtualization. PCI SR-IOV does not support creating nested VFs on VF.

Thus, the above-described nested hardware I/O virtualization usages must then turn back to utilizing software-based I/O virtualization techniques, which are typically extremely inefficient compared to hardware I/O virtualization. Although there have been some attempts to pass-through a device together with its SR-IOV capability to a VM, under this approach the L0-VMM would then lose hardware I/O virtualization capability on the device.

Another challenge regards architectural state replication. As SR-IOV requires each VF to have a replication of configuration space, separate MMIO Base Address Registers (BARs) for PF and VFs, replication of MSI-X storage for each VF, and function level reset (FLR) domains per each VF.

Further, SR-IOV also presents non-architectural state replication issues. The SR-My standard addresses only the PCI-Express host interface aspects of device virtualization. However, the sharing and virtualization of device-specific resources across VFs are not directly addressed by the SR-My standard, and are left for each device implementation to address. The more stateful the hardware/software interface of a device is, the costlier it is to replicate or partition device resources behind these interfaces for a large number of VFs. Addressing this requires device designs to reconsider their hardware/software interfaces to explicitly define them to be easier for partitioning/replication. Although this may not be an inherent limitation of SR-IOV itself, many SR-My device implementations in existence follow a "brute force" approach of replicating or partitioning resources for each VF, resulting in increased cost (in terms of complexity, required hardware, etc.) to scale to a large number of VFs.

Another issue involves dynamic resource allocation. To enable optimal flexibility for I/O virtualization usages, device designs following SR-IOV attempt to avoid fixed hard-partitioning of device resources—such as queue-pairs or contexts or command interfaces—to VFs. Instead, device designs accommodate flexible allocation of resources to VFs, configurable through the PF driver at the time of instantiating a VF on the device. Because each VF has its own fixed location within the VF BAR and has its own MSI-X table, the flexible allocation of resources requires another level of remapping in device designs to map which device resources (such as queue pairs or contexts or command buffers) are accessible from which VFs (setup at the time a VF is provisioned and assigned resources on the device). An example of this approach is a device implementation that supports a device-internal address-space for each queue-pair or context on the device, and implements a remapping scheme internal to the device to manage accessibility to the device internal address-space from PF-BAR or ranges in the VF BAR allocated for specific VFs. The complexity of such dynamic resource remapping in the device can further limit scalable sharing of device.

Additionally, other restrictions are explicitly imposed by the SR-IOV specification. For example, the SR-IOV device design restricts VF BARx to be of the same size among all the VFs, as well as the class-code (device-type) & Device ID to be identical between VFs as well. The SR-IOV specification also requires a VF class-code to be same as the PF's. Additionally, SR-IOV devices typically implement MSI-X tables of the same size between VFs. VF BARx is made up of contiguous set of pages and is usually mapped directly to the guest memory for fast-path access. Thus, the given restrictions or design considerations limit the possibility of creating heterogeneous and/or re-programmable devices (e.g., FPGAs) that can take-up any persona based on orchestrator/user request, and also leads to wastage of die area (e.g., unused gates in the hardware) for such devices. The SR-IOV bridge used in these re-programmable devices takes up many gates or logic-elements—especially when the VF count is high—which could have been otherwise used to implement orchestrator/user-requested accelerator functionality.

Accordingly, techniques disclosed herein provide a blueprint for high-performance I/O devices supporting scalable virtualization, which is also referred to herein as "Scalable IOV" (or Scalable I/O Virtualization). Embodiments disclosed herein address one or more (or all) of the aforementioned SR-IOV challenges through a combination of hardware/software techniques, which can allow device manufacturers to build flexible and scalable hardware enabling the highly-scalable and highly-performant sharing of I/O devices across isolated domains.

In some embodiments, high-performance I/O devices supporting scalable virtualization can utilize existing guest software implementations, and can contain the cost and complexity for endpoint device hardware to support such scalable sharing. Depending on the particular usage model of the embodiment, the isolated domains across which the device is shared may be traditional virtual machines, machine containers, bare-metal process containers, or application processes.

FIG. 1 is a block diagram illustrating an existing SR-IOV device architecture 100 adhering to the SR-IOV specification and a Scalable IOV device architecture 150 according to some embodiments. Some components of these architectures are illustrated for the purpose of clarity of description and thus, are not intended to be exhaustive of all components of such devices. It is to be understood that those of skill in the art, with the present disclosure, would be able to make (or implement) such devices/architectures without any undue burden or experimentation. Additionally, devices and/or systems embodying the disclosed techniques may include various numbers of these components and other components or other elements, such as additional peripherals and/or I/O devices. Thus, any or all of the components or other elements in these disclosed devices, architectures, or systems may be connected, coupled, or otherwise be coupled to be in communication with each other through any number of buses, point-to-point connections, or other wired or wireless interfaces or connections unless specified otherwise.

As described above and known to those of skill in the art, a SR-IOV device 102 adhering to the SR-IOV specification provides a PF with a PF BAR 104, PF configuration space 106, and PF MSI-X storage 108. Additionally, SR-IOV requires each VF to have a separate MMIO BARs (i.e., VF BARs 108A-108Z), each VF to have separate configuration space (i.e., VF Configuration spaces 110A-110H), each VF to have separate MSI-X storage (i.e., MSI-X spaces 112A-112H), separate function level reset (FLR) domains per each VF, etc.

For the VFs to be able to utilize the device's "backend" resources 116A-116M—which are represented in the Figures as including a number of queues 190 (or "Q")—the SR-IOV device 102 includes a module 114 (e.g., hardware circuitry) providing device resource remapping logic and VF-to-PF mailbox logic. Typically, SR-IOV devices utilize hardware-based mailbox communication to share data between guest and host drivers in an OS/VMM-agnostic manner, and also utilize logic to provide the necessary remapping of addresses for VFs/PFs.

Embodiments disclosed here provide a Scalable IOV architecture 150 that can provide one substantial improvements to this SR-IOV architecture 100. In some embodiments, a core principle is to improve the scalability of device by removing unnecessary architectural and non-architectural state replication, such as configuration space, MSI-X tables, FLR, etc., and to increase flexibility by not requiring devices to adhere to restrictions/requirements imposed by the SR-IOV specification, such as the requirements for equal-size MMIO between VFs, the use of a same class code, etc.

In some embodiments, attributes of the Scalable IOV architecture 150 can include an emulated configuration space for assignable entities, virtualized interrupt configuration for assignable entities, direct-mapped fast-path registers, virtualized slow-path operations, OS/VMM-agnostic software-based communication between guest and host drivers, virtualized functional level reset for assignable entities, software-defined device-specific front-end resource (e.g., MMIO, Interrupt) to back-end resource mapping (e.g., Network Interface Card (NIC) receive/transmit (Rx/Tx) queues, storage command queues, graphics processing unit (GPU) contexts, contexts for accelerators or Accelerator Function Units (AFUs)), dynamic and fine-grained resource sharing, etc.

Embodiments described herein can thus enable device vendors to build hardware that reduces the state replication for each assignable entity, and allows more flexible and dynamic resource allocation by virtue of hardware/software techniques. In achieving this, embodiments assure that fast data-path operations can be issued directly to underlying device hardware, thereby maintaining performance similar to other device assignment approaches (e.g. direct device assignment, SR-IOV virtual function assignment), while also allowing system designers to maintain existing software interfaces from the guest's point-of-view, thereby preserving existing software investments (i.e., not requiring custom software to be crafted specially for the device).

Moreover, in some embodiments this flexibility of devices implementing the Scalable IOV architecture 150 can support Scalable IOV on PCI SR-IOV VFs to enable nested hardware I/O virtualization capability (e.g., Scalable IOV on SR-IOV) for usages requiring nested hardware I/O virtualization or support for multi-hosting along with virtualization.

The Scalable IOV architecture 150 of some embodiments can use the advantage of the multi-queue/multi-context capable modern high-performance I/O device designs, and define an approach to share these devices at a device-specific finer granularity (e.g., queues 190, queue bundles, contexts), as opposed to the coarser SR-IOV VF granularity. The Scalable IOV architecture 150 can define the smallest granularity of sharing of a device as an "Assignable Interface" (or "AI"), which can be an independent portion of a device's capabilities that can be assigned to software domains (e.g., VMs, Containers).

Aspects of the Scalable IOV architecture 150, in some embodiments, make it is a more scalable and optimized solution when compared with the SR-IOV architecture 100 (or other device virtualization techniques, such as device emulation, device para-virtualization, direct device assignment, software mediated device assignment).

For example, in some embodiments, the Scalable IOV AI's do not implement a per-AI configuration space, which can thereby reduce the gate count and complexity in the hardware associated with the implementation of the configuration space, which is quite different than the SR-IOV architecture where hardware implements a configuration space 110A-110H for each VF. As control/configuration operations are not typically time critical, intercepting and emulating these operations in software—as done by some embodiments of the Scalable IOV architecture 150—doesn't impact the overall functionality. However, moving the configuration space management to software greatly helps in increasing virtualization scalability of the hardware, and can allow device vendors to add/expose or remove/hide hardware capabilities without actually modifying the underlying hardware (e.g., silicon). Thus, embodiments can improve the time-to-market for new devices by removing the hardware dependency in these areas.

As another example, in some embodiments the Scalable IOV architecture 150 allows AI MMIOs 156A-156X to be declared as system page size regions that are contiguous or scattered in the hosting function's MMIO, thereby increasing the flexibility and scalability of the MMIO layout in the hardware. Thus, this can allow non-uniform MMIO size between AIs, and enable heterogeneous devices where the MMIO size of each AI could be different. Thus, in some embodiments a Scalable IOV device 152 can reduce the amount of MMIO registers in the hardware by exposing host-intercepted MMIO or memory-backed MMIO through a software composed virtual device, which is quite different than the SR-IOV architecture 100 where VF BARs 108A-108Z are implemented as a contiguous set of registers that are always present and implemented in hardware.

As another example, in some embodiments the Scalable IOV architecture 150 does not need to provide or utilize separate MSI-X tables (e.g., 108, 112A-112H). Instead, embodiments can share interrupt storage of the physical or virtual function (also referred to as a "hosting function" going forward) or use non-architectural interrupt storage that is on the device or outside of the device in system memory, as opposed to SR-IOV devices 102 that implement MSI/MSI-X tables (112A-112H) for each VF.

As another example, in some embodiments a device implementing the Scalable IOV architecture 150 does not need to, for an AI, implement the PCI-Express Function Level Reset (FLR) capability. Instead, the Scalable IOV architecture 150 can allow device vendors to build non-architectural reset capability, thereby relaxing the restrictions enforced by the PCI-Express specification with respect to FLR and the associated hardware complexity.

As yet another example, in some embodiments the Scalable IOV architecture 150 relaxes the need to construct a hardware mailbox by instead allowing system software to implement a software-composed communication channel between guest and host drivers. Typically, SR-IOV devices 102 utilize hardware-based mailbox communication to share data between the guest and host drivers in an OS/VMM-agnostic manner. However, these mechanisms do not scale when increasing number of VFs, whereas the software-composed channel of the Scalable IOV architecture 150 is extremely scalable.

As another example, in some embodiments the Scalable IOV architecture 150 can reduce the gate count and device fabric complexity of adherent devices (e.g., Scalable IOV Device 152) and increase its scalability by moving resource mapping logic between front-end resources (e.g., MMIO, Interrupts) and back-end resources (e.g., Rx/Tx queues, command queues, GPU contexts, accelerator contexts) from hardware to software. Because the resource mapping is done by the system software in these embodiments, the devices and system software can utilize dynamic provisioning of back-end resources. In contrast, SR-IOV devices 102 typically build a mapping logic from the front-end resource to back-end resources in the hardware, and this mapping logic hard partitions backend resources across VFs—limiting flexibility and composability.

As another example, in some embodiments the Scalable IOV architecture 150 can be implemented "on top" of a SR-IOV VF to thus provide nested hardware I/O virtualization, which is not provided in any other solution currently in existence.

Thus, as shown in FIG. 1, an exemplary Scalable IOV device 152 implementing a particular embodiment of the Scalable IOV architecture 150 includes PF BARs 154 for AI MMIOs 156A-156X, a PF configuration space 158, and optionally a PF MSI-X storage 160 and/or an amount of extended storage 162 for AI MSI-X or AI Interrupt Message Storage. Thus, this exemplary Scalable IOV device 152 does not include a module 114 for device resource mapping logic, required separate storage implementation for each of the VF BARs 108A-108Z, required per-VF configuration space 110A-110H, or required per-VF MSI-X storage 112A-112H. Optionally, this exemplary Scalable IOV device 152 does not implement VF-to-PF mailbox logic, though it can still be implemented if needed.

As introduced above, in some embodiments the Scalable IOV architecture 150 can define a smallest granularity of sharing of a device 152 as an "Assignable Interface" ("AI"). Conceptually, an AI is somewhat similar to a VF (from SR-IOV), although it can be much lighter-weight and can be aggregated and composed by software to form a Virtual Device (or "VDEV").

For clarity of understanding, a high-level summary of some differences between the VDEVs/AIs of the Scalable IOV architecture 150 and the "VFs" of the SR-IOV architecture 100 are presented in Table 1, and are further expanded upon below.

TABLE 1

| | SR-IOV VFs | Scalable IOV VDEV (AIs) |
|---|---|---|
| Configuration Space | Implemented in hardware | Not implemented in hardware, but emulated through system software |
| MMIO Space | Fixed-size BARs Physically contiguous Implemented in Hardware | Variable-size BARs Physically contiguous or scattered Implemented in hardware for fast-path operations Virtualized through system software for slow-path operations |
| Interrupts | MSI or MSI-X support in hardware Table size fixed | Device-specific IMS Interrupt configuration virtualized Table size configurable through the system software |
| Function Level Reset | PCIe specification defined | Device specific |
| Guest/Host Communication | Hardware mailbox | Hardware mailbox Software managed communication |
| Frontend to Backend Resource Mapping | Usually implemented in the hardware | Can be managed by the system software |
| Nested Hardware I/O Virtualization | Cannot be supported | Can be implemented by providing Scalable IOV capabilities to SR-IOV VFs |

Figure 2:
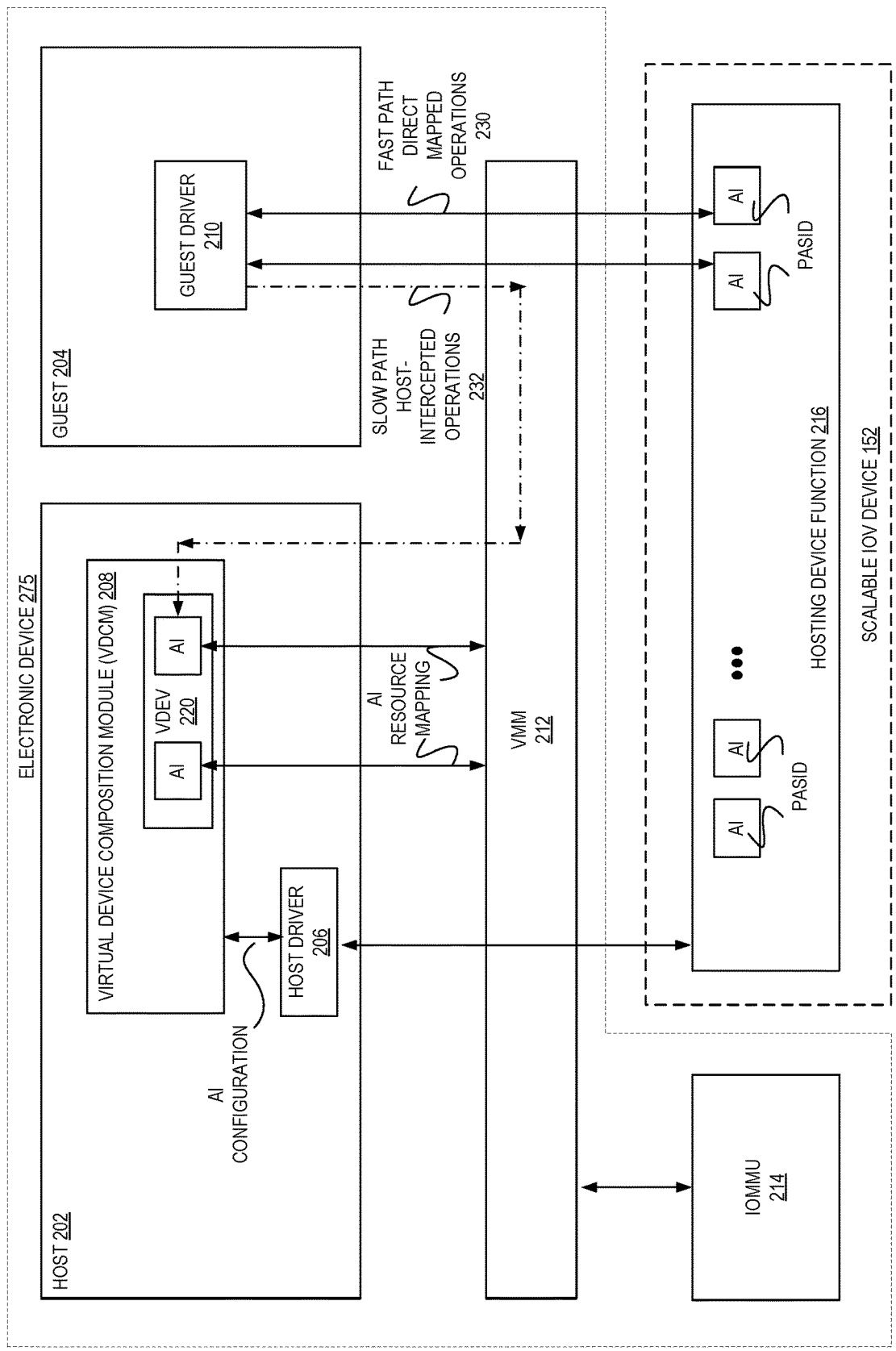
FIG. 2 is a block diagram illustrating exemplary operations and components of a device adhering to the Scalable IOV architecture that involves a host and guest according to some embodiments.

The below sections provide further detail of Table 1 with reference to FIG. 2, which illustrates exemplary operations and components of a device adhering to the Scalable IOV architecture that involves a host and guest according to some embodiments. FIG. 2 includes a host 202 including a host driver 206 and a virtual device composition module (VDCM) 208, a guest 204 including a guest driver 210, a VMM 212, an IOMMU 214, and a hosting device function 216.

Configuration Space:

Scalable IOV devices, in some embodiments, do not implement per-AI configuration space in the hardware, and can instead rely on system software to expose a virtual configuration space through a VDEV. Emulation of configuration space allows device vendors to maintain existing software interfaces while reducing hardware complexity and gate-count, while increasing scalability and flexibility.

In some embodiments, the system software composes a virtual device 220 and exposes a virtual configuration space to the guest 204. Access to this virtualized configuration space can be trapped using the second-level CPU address translations and emulated in the host software, thereby allowing an existing software stack to run in the guest 204 environment without any modifications. In contrast, typical VMMs (as of today) trap configuration space accesses for SR-IOV VFs as well and read the real VF configuration space from host OS; however, in the case of the Scalable IOV architecture 150 it can be completely emulated through software.

According to some embodiments, moving the configuration space management to software greatly helps in increasing virtualization scalability of the underlying hardware, and can also allow device vendors to add/expose or remove/hide hardware capabilities without actually modifying the underlying silicon. This functionality can be crucial in working around a hardware bug or creating an early prototype where new functionality is emulated through the software in its entirety.

MMIO Space:

In some embodiments, the Scalable IOV architecture 150 can host AI MMIO registers 156A-156X in one or more system page size regions within the Hosting Function's (e.g., PF or VF's) MMIO space. In some embodiments, an AI's MMIO can be contained within a single memory BAR, or can span across multiple memory BARs of the Hosting Function, thereby increasing the flexibility and scalability of the MMIO layout in the hardware. Embodiments can thus allow non-uniform MMIO size between AIs, thus enabling heterogeneous devices where the MMIO size of each AI could be different. Thus, in some embodiments the amount of MMIO registers in hardware can be reduced—even to the extent where none are implemented in the hardware—by exposing host-intercepted MMIO or memory-backed MMIO through a software-composed virtual device 220. Thus, even though AI MMIO registers may be scattered, they can be exposed as contiguous regions, e.g., through second-level page tables.

In some embodiments, the Scalable IOV architecture 150 partitions its MMIO registers into two categories—(1) MMIO registers accessed frequently and utilized for fast-path operations (e.g. work submission, work completion), and (2) MMIO registers accessed infrequently for slow control and configuration/administrative path operations. This hybrid approach of embodiments of the Scalable IOV architecture 150 allows the system software to dynamically categorize which MMIO register regions belong to fast-path, and which ones belong to slow-path.

According to some embodiments, system software backs (i.e., creates second level address translation for) fast-path registers, which allows a direct communication 230 from the guest to hardware without an involvement of a VMM. For example, as part of composing a VDEV instance 220, the VDCM 208 can define the system page size ranges in VDEV virtual BARs (e.g., in guest physical address (GPA) space) that needs to be mapped to MMIO page ranges (e.g., in host physical address (HPA) space) of backing AIs. The VDCM 208 can request the VMM 212 to set up respective GPA-to-HPA mapping in the CPU second-level address translation, enabling direct access by a guest driver 210 to the backing AI MMIO. Such mappings may support a contiguous GPA range of VDEV MMIO to be mapped to discontinuous set of system page size regions on AI MMIO.

Slow-path registers, in some embodiments, are not mapped in the second level address translation, thereby allowing trap and emulation by the host 202 software, e.g., slow path host-intercepted operations 232. Using this approach, the typically complex slow-path operations/interfaces are not required to be implemented/replicated for each AI instance in hardware, and instead, AIs can be used only for fast-path direct work submission and completion operations. For example, in some embodiments VDCM 208 may achieve this by requesting the VMM 212 to not map the MMIO regions (hosted in GPA space) in the CPU second-level translation, thus forcing a VM Exit (e.g., Extended Page Table (EPT) VM-Exits on Intel® 64 platforms) on a guest driver 210 access to such registers. The VMM 212 can emulate the guest 204 instruction access that caused such a VM Exit, and can forward information of such guest 204 accesses (which can include the VDEV register address accessed, an indicator of whether the access is a read or a write, the width of access, and/or whether the data written) to the VDCM 208. Depending on the type of access and resource accessed, the VDCM 208 may virtualize these accesses entirely in software, or proxy them to the host driver 206.

In some embodiments, if there are VDEV 220 registers that are read frequently by a guest driver 210 (and have no read side-effects) yet require VDCM 208 intercept on write accesses, such registers may be mapped by the VMM 212 as read-only to the backing memory pages provided by VDCM 208. This can enable the VDEV 220 composition software in the host 202 to support high-performance read accesses to such virtual registers (e.g., via direct memory access by guest 204), and yet, properly virtualize its side-effects through intercepts on guest 204 write accesses to them. Any such 'write intercept only' registers can be in separate system page size regions than the 'read-write intercept' registers.

As described above, embodiments of the Scalable IOV architecture 150 provide substantial flexibility to the device vendors (e.g., in laying out MMIO registers in hardware) and also provide flexibility to the system software to map/expose these regions in a "best" possible way.

Figure 8:
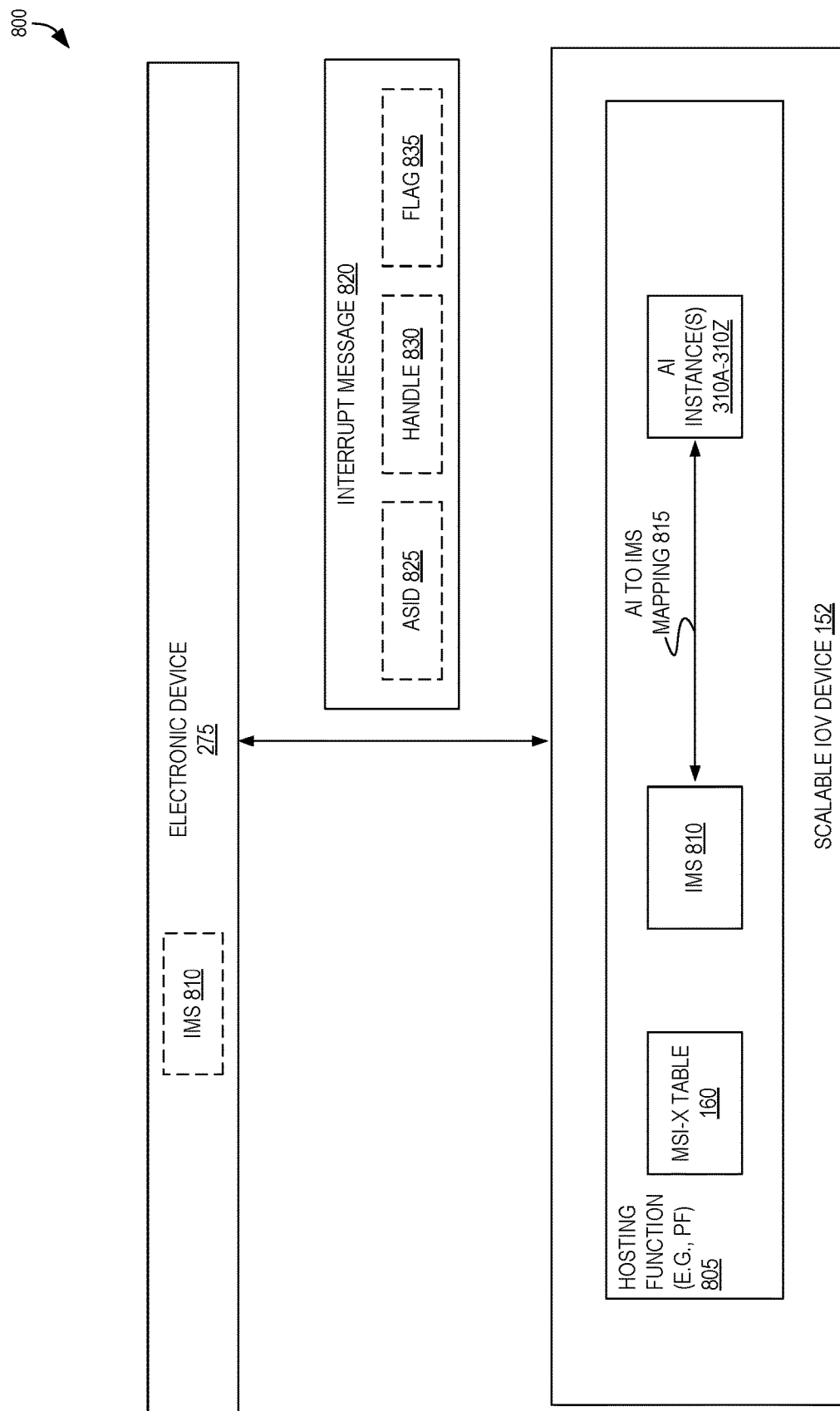
FIG. 8 is a block diagram illustrating an example Scalable IOV architecture for implementing interrupt message storage according to some embodiments.

Interrupts:

The Scalable IOV architecture 150 can allow device vendors to implement interrupt message storage (IMS) in a device-specific way. For example, we now turn ahead to FIG. 8, which is a block diagram illustrating an example Scalable IOV architecture 800 for implementing interrupt message storage according to some embodiments. FIG. 8 includes an electronic device 275 that optionally implements an IMS 810 in some embodiments, though in other embodiments the IMS 810 can be implemented by a Scalable IOV device 152 as described below. FIG. 8 also illustrates an interrupt message 820 sent between the Scalable IOV device 152 and the electronic device 275, which can include (or be sent together with) one or more of an ASID 825, a handle 830, a flag 835, etc. FIG. 8 also illustrates a Scalable IOV device 152 including a hosting function 805 (e.g., a physical function, virtual function).

In some embodiments, a Scalable IOV device 152 can implement non-architectural IMS 810 for storing the AI instances 310A-310Z interrupt messages 820. The IMS 810 can be implemented on-device or off-device. For example, in some embodiments a VMM 212 (not shown) can implement the IMS 810 for the Scalable IOV device 152 in host memory (not shown) of the electronic device 275. In some embodiments, the IMS 810 includes interrupt information stored in a device specific table (not shown) in host memory. A Scalable IOV device 152 can read this table associated with the IMS 810 to identify the interrupt information for each of the AI instances 310A-310Z. In some embodiments, to optimize performance, the Scalable IOV device 152 can use an on-device cache for the IMS 810 to store interrupt information that is more frequently used by the AI instances 310A-310Z.

In some embodiments, the Scalable IOV device 152 can map 815 each of the AI instances 310A-310Z to entries in the IMS 810 for specific interrupt messages 820 to be sent (e.g., to the VMs implemented by electronic device 275). The Scalable IOV device 152 can implement this mapping is a variety of ways. As one example, the Scalable IOV device 152 can implement an Address Space Identifier (ASID) 825-to-interrupt mapping. The Scalable IOV device 152 can, for example, first identify the trusted ASID 825 for the corresponding AI instance 310A and map it to the interrupt entries in the IMS 810. The interrupt messages 820 could be stored as part of per-AI state in the I/O device 152, or could be stored in a separate (contiguous) table. For the table, a mapping approach can be used that includes statically partitioning the table and allocating fixed entries in the table for the AI instances. Alternatively, the Scalable IOV device 152 can implement dynamic remapping logic to allocate any entry in the table to any AI instance.

As another example, the Scalable IOV device 152, in some embodiments, uses a different MMIO address for each AI instance's command submission register. For example, Scalable IOV device 152 can use a different "tail" (or "doorbell") register for each command queue. Thus, even if the Scalable IOV device 152 uses a shared work queue (SWQ) for multiple AI instances, it can still use a different MMIO register for each AI instance 310A that submits the command to the same SWQ. When a VM submits commands, the MMIO address of the respective command submission register can be used to map to the IMS 810 entries. The command submission address of the AI instance 310A can be hashed to compute an index into the table to identify the interrupt message entries for the AI instance 310A.

Thus, the IMS can be implemented by the I/O device such that it is not accessible by the guest 204 software—instead, only the trusted host 202 software (typically the host driver 206) can access and program interrupt messages into the IMS. The host driver can access the on-device IMS using MMIO registers, while it can access the off-device IMS by allocating and accessing host memory.

Because, in these embodiments, the IMS is not directly accessible to guest 204 software, VDCM 208 can take the responsibility of virtualizing the interrupt configuration. The VDCM 208 virtualizes the interrupt by, for example, creating a virtual MSI-X table or by creating a virtual non-architectural IMS through the VDEV. Exposing a virtual MSI-X table (through the virtual PCIe MSI-X capability) in the VDEV can be sufficient under most situations because a single VDEV is not expected to use more than 2048 interrupts. However, if the VDEV needs more than 2048 interrupt messages, VDCM 208 can implement a virtual non-architectural IMS in VDEV. The rest of the description will assume the use of a virtual MSI-X table for the sake of simplicity of discussion; however, the same mechanisms can apply to a virtual non-architectural IMS as well.

In some embodiments, the VDCM 208 keeps the virtual MSI-X table unmapped in the guest 204. During interrupt initialization in the guest 204, the guest OS sees the MSI-X capability and MSI-X table in the VDEV 220, and configures interrupts in the virtual MSI-X table entries. These writes are trapped by the VMM 212 and forwarded to the VDCM 208 for emulation. The VDCM 208 can request the host driver 206 to configure corresponding physical interrupts in the IMS.

If the device implements dedicated storage for interrupt messages, the host driver 206 can allocate an entry in the non-architectural IMS and program the interrupt message. The host driver 206 also can create an AI-to-interrupt mapping for this entry using device-specific methods. Because, in some embodiments, the guest 204 is not allowed to access the IMS directly and only the host driver 206 can access it, the interrupt entries in the IMS can be trusted by the device.

Function Level Reset:

As the VDEV 220 exposes a virtual configuration space, the VMM 212 can intercept writes to FLR from the Guest 204 OS and can ask the VDCM 208 or Host driver 206 to perform function level reset in a device-specific manner. Thus, in some embodiments, the device doesn't need to implement the PCIe specification-defined function level reset for each of its assignable entities.

Hardware Mailbox:

In some embodiments, the Scalable IOV architecture 150 relaxes the need to implement hardware mailbox-based communication between host drivers 206 and guest drivers 210 by allowing an OS/VMM-agnostic software-managed data communication between these drivers.

The utilized communication channels, in some embodiments, support two facilities: the ability to convey data between guest 204 and host 202, and the ability to invoke a software handler across guest/host to proxy some operation or action.

The VDEV 220 can expose one or more system page size regions in virtual MMIO space that are set up as fully memory backed (e.g., mapped to memory with read and write access) that acts as a shared memory between Guest VM and Host VM. The VDEV 220 can also expose a mailbox register within intercepted MMIO that can be used by the guest driver 210 to notify the Host VM (i.e., by writing to the mailbox register) of the availability of the data in this shared region. Similarly, a Host VM can use a virtual interrupt to notify the Guest VM about the availability of the data in this shared region. These virtual interrupts can be independent and separate from the interrupts generated by the AI hardware itself. This type of fully memory backed virtual registers may be considered as an optimization to avoid host intercept and instruction emulation cost for passing data between guest 204 and host 202.

Figure 3:
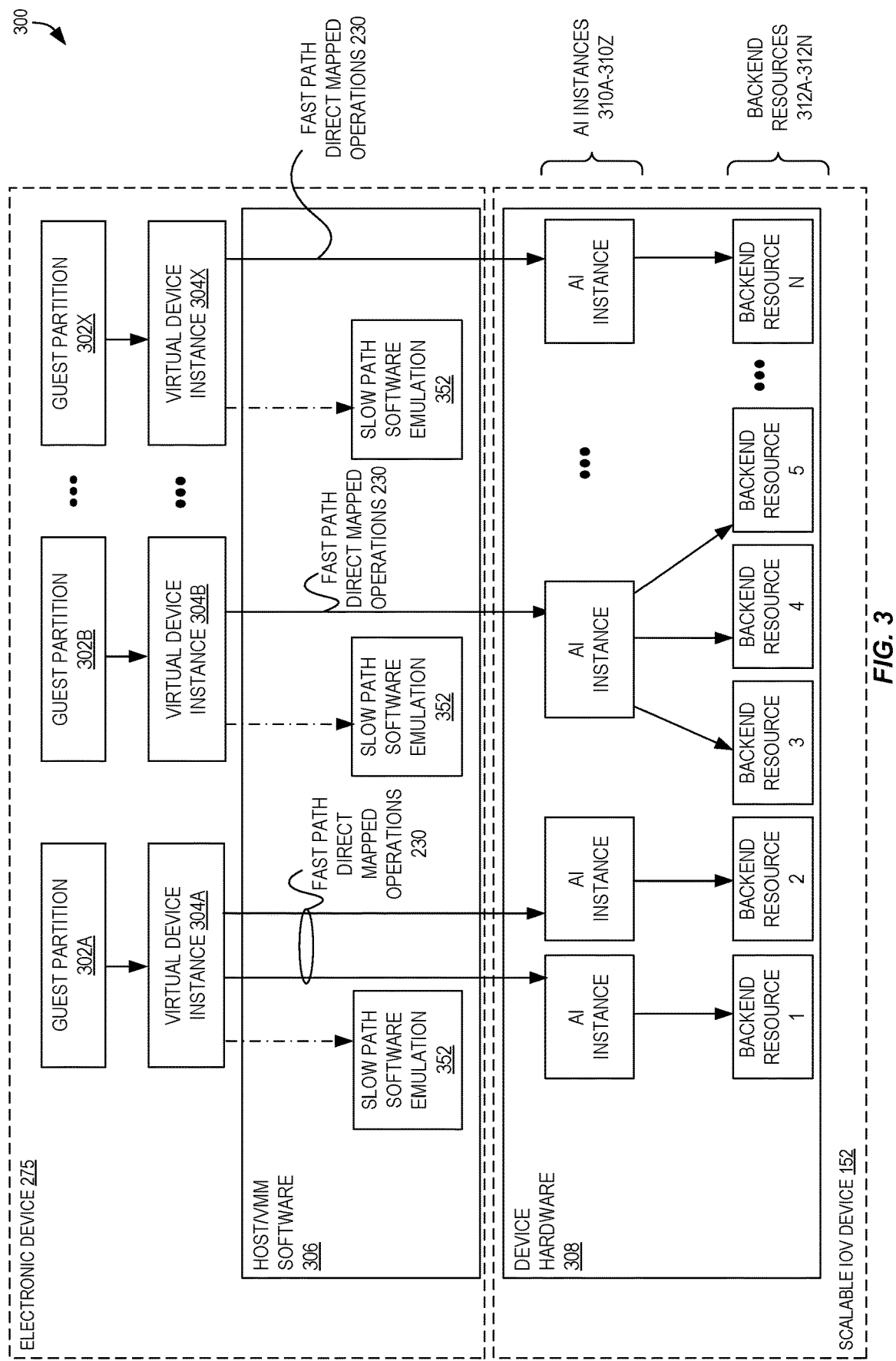
FIG. 3 is a block diagram illustrating numerous guest partitions utilizing virtual device instances to utilize multiple AI instances via fast-path and slow-path operations according to some embodiments.

Back-End Resources and Resource Mapping Logic:

For further detail we turn to FIG. 3, which is a block diagram illustrating numerous guest partitions utilizing virtual device instances to utilize multiple AI instances via fast-path and slow-path operations according to some embodiments. As shown, a number of guest partitions 302A-302X can utilize a number of virtual device instances 304A-304X, which themselves can access backend resources 312A-312N using fast-path direct mapped operations 230 to access AI instances 310A-310Z or slow-path operations via software emulation 352.

Back-end resources 312A-312N refer to device-specific resources or constructs on the endpoint device that accept and dispatch fast-path operations. For example, for a network controller device, an AI (e.g., AI instance 310A) may be composed of a set of Tx/Rx queues associated with a Virtual Switch Interface (VSI). Additionally, an AI on a NVM Express (NVMe, or Non-Volatile Memory Host Controller Interface Specification (NVMHCI)) storage controller could be the bundle/set of command queues (and respective completion queues) associated with a common storage namespace. For a GPU, an AI could be the set of GPU contexts created through a Virtual Device (vGPU) instance. For an FPGA device, each AI could be an entire Accelerator Function Unit (AFU) or a context of a multi-context capable AFU.

Thus, the Scalable IOV architecture 150 of some embodiments provides a mechanism to move the mapping logic from hardware to software, which reduces the hardware complexity and cost, and provides increased scalability. In some embodiments, the system software composing the VDEV 220 can dynamically associate these back-end resources. Further, software can utilize the second-level address translation capability of the CPU to enforce resource isolation for the AIs. This can allow, for example, system software or an orchestrator to build VDEVs 220 (here instantiated as virtual device instances 304A-304X) with different capabilities/configurations, e.g., a VSI with 8 Tx/Rx queues, a VSI with 1 Tx/Rx queue, a VSI with 16 Rx/Tx queues, and/or a VDEV with 2 VSIs, etc.

Isolation:

In the Scalable IOV architecture 150 of some embodiments, the operations or functioning of one AI must not affect functioning of other AIs or the functioning of the hosting function. Furthermore, a guest making use of one AI must not be able to observe operations or data being processed by other AIs. There are several techniques that can be used in some embodiments to provide this required isolation.

One technique is isolation using Process Address Space Identifiers (PASIDs). In some embodiments, untranslated and translation requests from AIs are a request-with-PASID, with its assigned PASID value in PASID TLP prefix. The PASID identity for an AI can, in some embodiments, only be programmed or modified by its host driver.

Another technique for providing isolation involves using "pseudo Requester IDs." In embodiments using this technique, the untranslated and translation requests from the AIs will use assigned pseudo Requester IDs that are specific/unique to an AI.

In some embodiments, AI MMIO registers are in unique system page size regions, thus assisting with isolation.

In some embodiments, for interrupt isolation purposes, device-specific Interrupt Message Storage (IMS) may be configured to only be accessible from the host driver and the Interrupt Message Generation logic, and not directly from AIs or guest drivers. In embodiments using this technique, this ensures that AIs cannot modify IMS contents and can use interrupts only using IMS entries assigned by the host driver for respective AIs.

In some embodiments, peer-to-peer access (internal to the device, or at I/O fabric egress) between AIs, or access between an AI and the Hosting Function, is prohibited. This can guarantee that all AI DMAs go to upstreaming IOMMU for arbitration.

Additional detail for several of these isolation techniques is now presented.

Isolation Using PASIDs

In some embodiments, AIs on an endpoint device share the same Requester-ID (e.g., Bus/Device/Function number, or "B/D/F number") of the hosting device function. Thus, a Requester-ID alone in the upstream requests from the endpoint device is not enough to distinguish if the request is from the Hosting Function or from specific AIs. Thus, the AI PASID can be used to distinguish requests from different AIs and requests from the Hosting Function.

Virtualization software, in some embodiments, can compose a VDEV using one or more AIs. If all AIs instantiated "behind" a VDEV are accessing a common address space, they can all be assigned a same PASID. For example, a NIC device may define a Tx/Rx queue pair as an AI. Software may bundle some number (or "N") of these AIs (e.g., all configured to the same Virtual Switch Port on the NIC) to form a Virtual Device (a "vNIC") and bind it to a Guest OS network stack. In this case, all of these N AIs may be assigned the same PASID, and DMA Remapping hardware can be setup with appropriate second-level translation (e.g., GPA-to-HPA) for the PASID.

In some embodiments, when multiple AIs instantiated behind a VDEV are accessing different address spaces, each such AI can be assigned a unique PASID. For example, a GPU device capable of Shared Virtual Memory (SVM) support may define a GPU Context as an AI. A Virtual GPU Device (vGPU) could instantiate multiple AIs (e.g., GPU Contexts) for each Guest application subscribed to the vGPU. In this case, AIs allocated for each guest application can be assigned a unique PASID number, and DMA Remapping hardware is setup with appropriate nested first- and second-level translations (e.g., Guest Virtual Address (GVA)-to-GPA-to-HPA) for the PASID.

In some embodiments, the DMA Remapping hardware capable of supporting the Scalable IOV architecture can use the PASID tag to support PASID granular address translation functions. These address translation functions could be blocked, passthrough, first-level translation only, second-level translation only, nested first/second level translation, etc.

Upstream requests by the Hosting Function—as opposed to upstream requests by any of its instantiated AIs—may or may not use PASID tagged requests in various embodiments. For example, if the Hosting Function is limited to accessing a single address space, for backward compatibility with older OSs and platforms, the Hosting Function may restrict itself to upstream requests without PASID. However, if the Hosting Function is capable and enabled for accessing multiple address spaces (e.g., supports Shared Virtual Memory), it may be provisioned with PASIDs for tagging its upstream transactions.

Accordingly, in some embodiments a PASID is allocated for each address space that may be accessed directly by any endpoint device function (PF, VF, or AI) using PASID-tagged transactions. Depending on the usage and programming of the platform DMA Remapping hardware, the address space targeted by a request with PASID can be a HPA, a HVA shared with the host CPU, a Host I/O Virtual Address (HIOVA), a GPA, a GVA shared with virtual CPU, a Guest I/O Virtual Address (GIOVA), etc.

Isolation Using Pseudo Requester-IDs

In some embodiments, providing PASID-granular isolation may lead to changes in the DMA Remapping hardware to support PASID-granular (as opposed to Requester-ID-granular) second-level address translation. The approach described next can allow device vendors to build Scalable IOV compliant hardware (with limited scalability, but full flexibility) without platform changes.

In some embodiments, based on the maximum number of AIs to be supported, Requester-IDs (RIDs) to be used by the device can be "carved-out" during the system boot (through Root Complex defined in ACPI for PCIe Root Complex Integrated Endpoints or through fake SR-IOV capability for PCIe Endpoints or another platform-specific mechanism). System software associates Requester-IDs for AIs allocated to the same VDEV from this allocated pool. Upstream requests from AIs allocated to a given VDEV can use this pseudo Requester-ID to tag the traffic and a given RID can be used to acquire necessary second-level address translation (similar to how upstream requests from SR-IOV VFs are translated).

Accordingly, in embodiments using this approach, the benefits of Scalable IOV around configuration space, MMIO, FLR, Interrupts, etc., can be utilized from the device point-of-view by simply allocating pseudo Requester-IDs.

Nested Hardware I/O Virtualization:

In some embodiments, the Scalable IOV architecture 150 can be enabled on nearly any type of device, without the need to change the existing PCI bus standard. Thus, embodiments can implement the Scalable IOV capability in PCI SR-IOV VF to enable nested hardware I/O virtualization.

In such embodiments, system software (e.g., a guest OS, a nested VMM, a bare-metal OS/VMM in a multi-hosting usage) is expected to deploy the same set of software components, as deployed in host environment on PF to use the Scalable IOV capability. The VF driver is responsible for enumerating the Scalable IOV capability on VF and then expose AI management APIs to other components. The VDCM is responsible for composing a VDEV on top of one or more AIs created on VF, and for talking to VMM to configure passthrough/trap policies for AI resources and emulated resources. The Guest VDEV driver is responsible for accessing VDEV resources as enumerated by VDCM.

Several examples of embodiments enabling nested hardware I/O virtualization in demanding usages are now provided. We first turn to FIG. 4, which is a block diagram of a VM container scenario using nested hardware I/O virtualization according to some embodiments.

Figure 4:
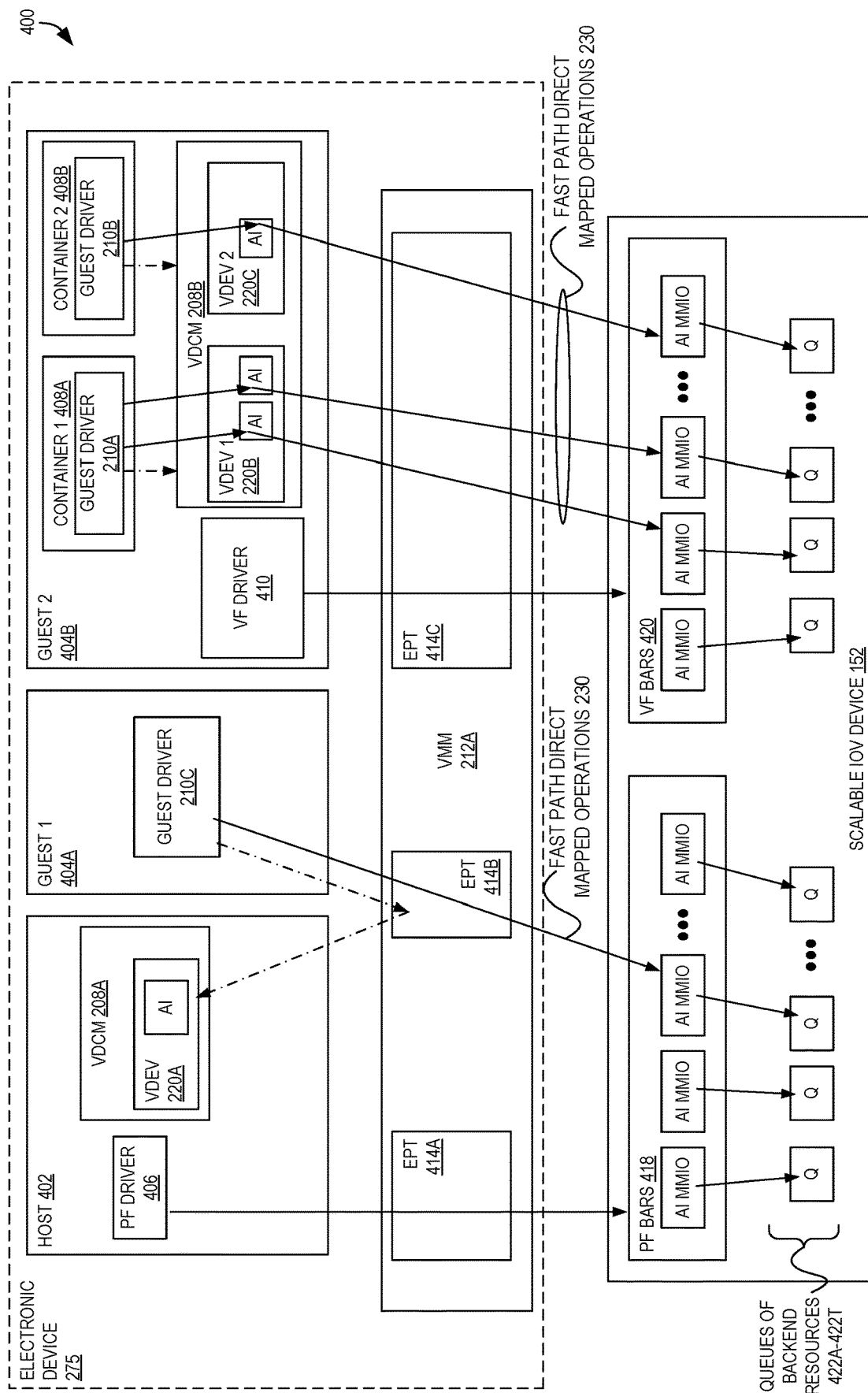
FIG. 4 is a block diagram of a VM container scenario using nested hardware I/O virtualization according to some embodiments.

FIG. 4 illustrates a host 402 including a VDCM 208A and a PF driver 406, a first guest (Guest 1) 404A including a guest driver 210C, and a second guest (Guest 2) 404B including two containers 408A-408B with a VF Driver 410 and a VDCM 208B. FIG. 4 also includes a VMM 212A with multiple EPT 414A-414C, and a Scalable IOV device 152 with PF BARs 418 and VF BARs 420 (having AI MMIO) accessing queues 422A-422T of backend resources provided by the device 152.

In FIG. 4, the VF Driver 410 within Guest2 404B enumerates the Scalable IOV capability on assigned VF through VF BARs 420, and then exposes Scalable IOV management interfaces to VDCM 208B. The VDCM 208B requests the VF driver 410 to allocate one or more AIs on VF device, and compose AIs into VDEV1 220B and VDEV2 220C individually for Container1 408A and Container2 408B. Then, the containers 408A-408B within Guest2 404B can benefit from nested hardware I/O virtualization, with direct access to AIs for fast data-path operations 230. In the meantime, the Host 402 can still utilize Scalable IOV capability on PF for other guests (e.g., Guest1 404A).

Figure 5:
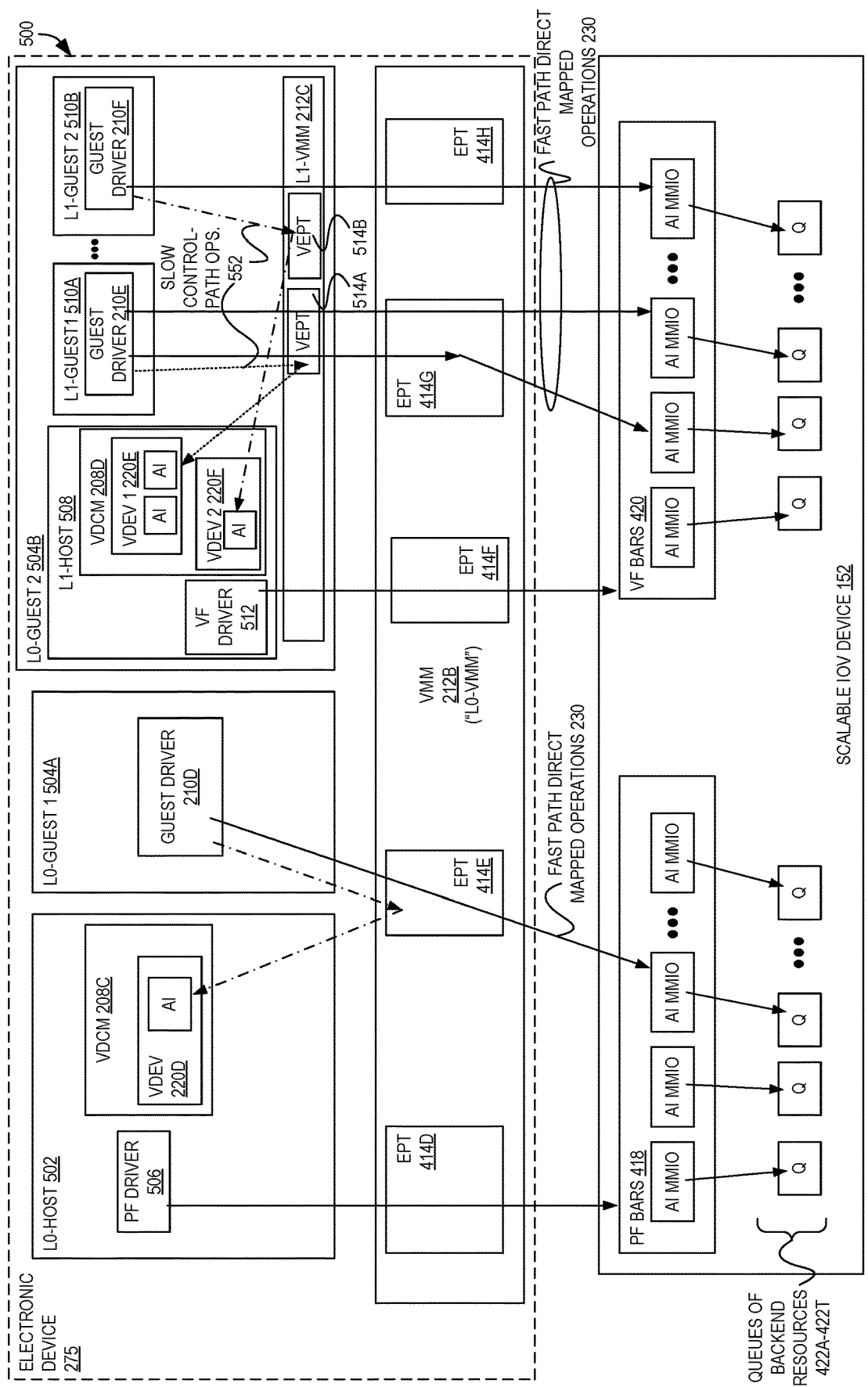
FIG. 5 is a block diagram of a multi-level virtualized scenario using nested hardware I/O virtualization according to some embodiments.

Another example of an embodiment utilizing nested hardware I/O virtualization is shown in FIG. 5, which is a block diagram of a multi-level virtualized scenario using nested hardware I/O virtualization according to some embodiments. In FIG. 5, the Scalable IOV device 152 and VMM 212B (here acting as a L0-VMM, or "level-0" VMM, in which L0, L1, etc., prefixes are used to assist in differentiating between layers in nested virtualization scenarios—see L1-VMM 212C, L1-Host 508, etc.) are substantially the same as in FIG. 4, and in more stark contrast in this Figure there is a L0-Host 502 (including a PF driver 506 and a VDCM 208C), a L0-Guest 1 504A (including a guest driver 210D) an L0-Guest 2 504B.

The illustrated L0-Guest 2 504B provides a layer of "nesting" in that it includes a L1-VMM 212C (with virtual EPTs, or VEPTs 514A-514B) with a L1-Host 508, L1-Guest1 510A, and L1-Guest2 510B. The L1-Host 508 includes a VF driver 512 and a VDCM 208D exposing a VDEV 1 220E and a VDEV 2 220F. Each L1-Guest—i.e., L1-Guest1 510A and L1-Guest2 510B includes a corresponding guest driver 210E-210F.

Similar to the VM containers of FIG. 4, in FIG. 5 the VF driver 512 in L1-Host 508 enumerates a Scalable IOV capability on an assigned VF to provide AI management interfaces to VDCM 208D. The VDCM 208D virtualizes AIs into VDEV1 220E and VDEV2 220F exposed individually to L1-Guest1 510A and L1-Guest2 510B. The guest drivers 210E-210F within the L1-Guests 510A-510B acquire direct access to assigned AIs for fast data-path operations 230, with slow control-path operations trap-and-emulated by VDCM 208D in L1-Host 508.

In some embodiments, the Scalable IOV architecture can be also implemented on a VDEV that itself is created through the same Scalable IOV architecture, which can be referred to as "nested Scalable IOV." Both the VM container scenario illustrated in FIG. 4 and the multi-level virtualization scenario shown in FIG. 5 can be implemented using such a "nested" Scalable IOV architecture. For example, with regard to FIG. 4, the VDCM 208A can choose to emulate Scalable IOV capability on VDEV 220A, following the aforementioned techniques regarding configuration space, MMIO space, interrupts, isolation, etc. Thus, in some embodiments VDEV 220A may be emulated as a device that supports Scalable IOV capability. In such a case, the previous operations described within GUEST 2 404B can be reused, as it is a Scalable IOV device from the perspective of GUEST 2. In some such embodiments, the Scalable IOV device 152 may not implement VF BARs 420 but instead, the AI MMIO regions used by the containers could be part of the PF BARS 418.

In some "nested Scalable IOV" embodiments, the VDCM 208A is configured to be responsible for translating virtual Scalable-IOV configurations (e.g., done by VF driver 410 in GUEST 2 404B) on VDEV 220A to the physical Scalable-IOV control structures of the physical Scalable IOV device 152. As the Scalable IOV capable device may also require support from an upstream IOMMU device, the host 402 may also need to emulate a virtual IOMMU to GUEST2 404B, and translate the virtual IOMMU configuration from GUEST 2 404B to the physical IOMMU.

Figure 6:
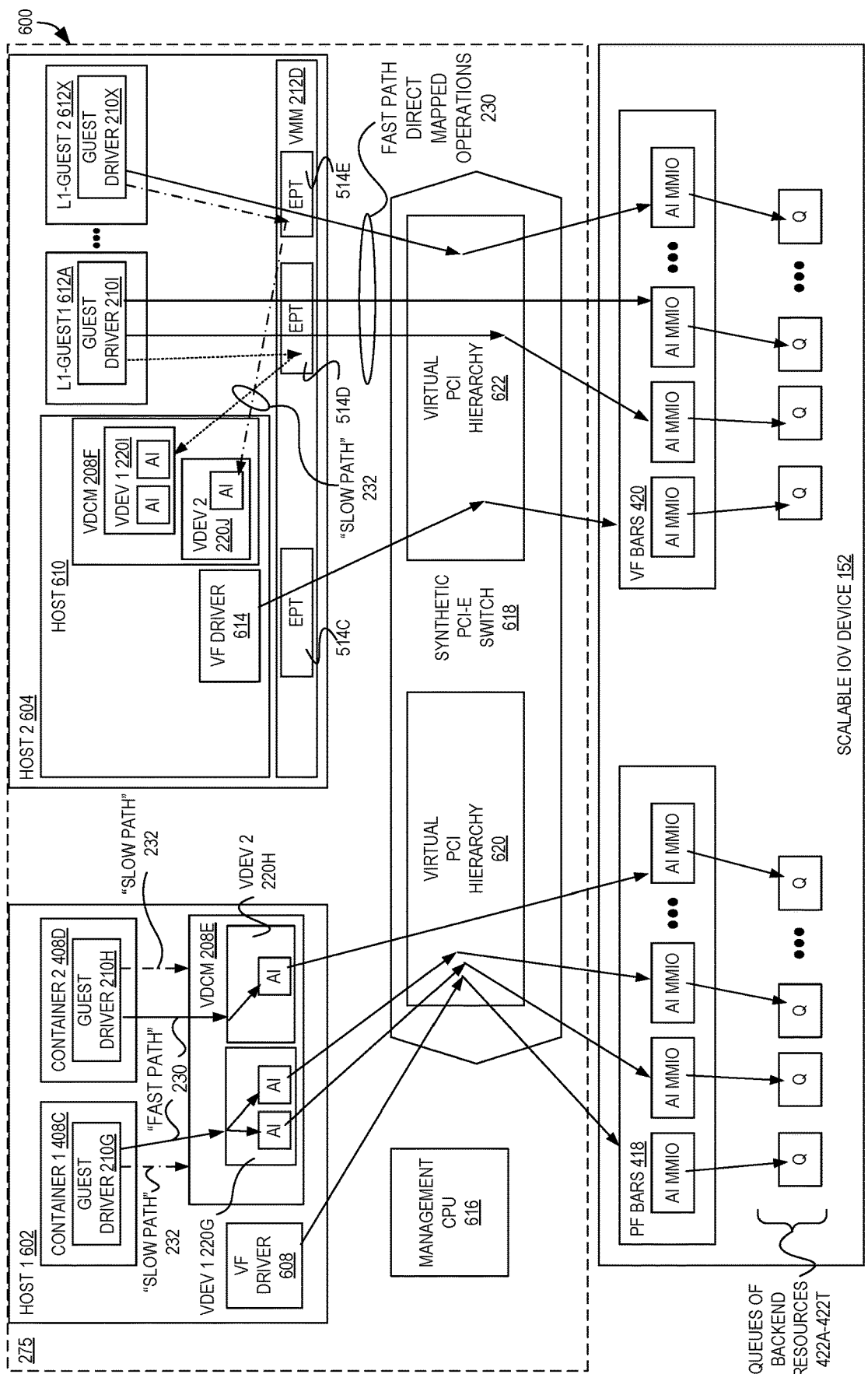
FIG. 6 is a block diagram illustrating an example architecture for multi-hosting usages according to some embodiments.

FIG. 6 is a block diagram illustrating an example architecture for multi-hosting usages according to some embodiments. In FIG. 6, a synthetic PCI-E switch 618 exposes virtual PCI hierarchies 620-622 with the help of a Management CPU 616, so VFs are exposed to each host as a standalone PCI endpoint device. Traffic from different hosts is routed through the virtual PCI hierarchy 620-622 to its assigned VF. By implementing this Scalable IOV capability on each VF, every host can enumerate hardware I/O virtualization capability on its assigned VF and then enable distinct features using hardware I/O virtualization. FIG. 6, for example, shows a Host1 602 using Scalable IOV to accelerate bare metal containers 408C-408D, and Host2 604 bringing hardware I/O virtualization to multiple VMs 612A-612X.

Accordingly, the techniques of various embodiments described herein can greatly improve hardware scalability and flexibility while keeping these changes transparent to the guest software. Embodiments provide, at worst, identical performance to existing high-performance device virtualization techniques like SR-IOV, and can also addresses challenges imposed by them. Further, some embodiments can enable nested hardware I/O virtualization usages that are critical in modern deployment environments. The techniques disclosed herein may be especially useful for implementing Server Systems-on-a-Chip (SoC) and CPUs that will be used in large datacenter (or cloud) environments and may be used with containers and/or virtual machines and may employ heterogeneous computing capabilities on their platforms. These techniques can also be beneficial for devices such as GPUs, FPGAs, fixed function accelerators, etc., which can be specially formed to be useful with container-heavy environments. These techniques can also be useful for large computing systems providing cloud services and/or communication services (e.g., providing Network Function Virtualization (NFV) and/or Software Defined Infrastructure) seeking improved I/O performance for container-based deployment/management models.

Figure 7:
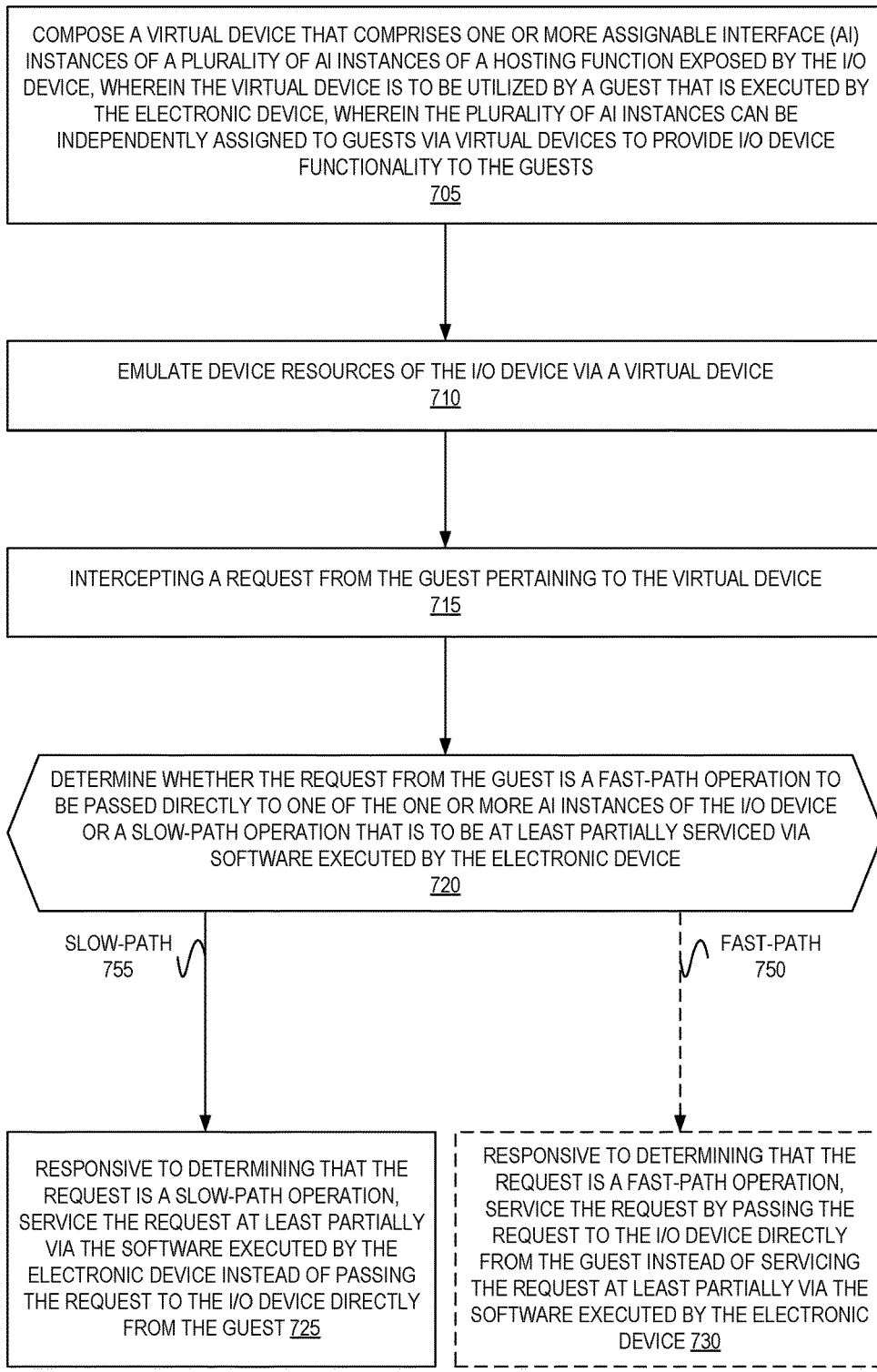
FIG. 7 is a flow diagram illustrating a flow of operations for providing scalable virtualization of an I/O device according to some embodiments.

FIG. 7 is a flow diagram illustrating a flow of operations for providing scalable virtualization of an I/O device according to some embodiments. The operations in this flow diagram will be described with reference to the exemplary embodiments of the other figures. However, it should be understood that the operations of this flow diagram can be performed by embodiments other than those discussed with reference to the other figures, and the embodiments discussed with reference to these other figures can perform operations different than those discussed with reference to this flow diagram. In some embodiments, the flow 700 is performed by a Scalable IOV device 152, and certain ones of the operations could be performed by the VDCM 208, host driver 206, VMM 212, etc., either alone or in combination.

Flow 700 includes, at block 705, composing a virtual device that comprises one or more assignable interface (AI) instances of a plurality of AI instances of a hosting function exposed by the I/O device. The virtual device is to be utilized by a guest that is executed by the electronic device. The plurality of AI instances can be independently assigned to guests via virtual devices to provide I/O device functionality to the guests. The flow 700 also includes, at block 710, emulating device resources of the I/O device via the virtual device. Flow 700 also includes, at block 720, intercepting a request from the guest pertaining to the virtual device, and at decision block 720, determining whether the request from the guest is a fast-path 750 operation (e.g., a "regular" or "frequent" operation) to be passed directly to one of the one or more AI instances of the I/O device, or a slow-path 755 operation (e.g., a "non-regular" or "non-frequent" operation) that is to be at least partially serviced via software executed by the electronic device.

Responsive to determining that the request is a slow-path 755 operation, at block 725 the flow 700 includes servicing the request at least partially via the software executed by the electronic device instead of passing the request to the I/O device directly from the guest.

Optionally, responsive to determining that the request is a fast-path 750 operation, at block 730 the flow 700 includes servicing by passing the request to the I/O device directly from the guest instead of servicing the request at least partially via the software executed by the electronic device.

EXAMPLES

In some embodiments, a method in an electronic device for providing scalable virtualization of an Input/Output (I/O) device coupled with the electronic device comprises: composing a virtual device that comprises one or more assignable interface (AI) instances of a plurality of AI instances of a hosting function exposed by the I/O device, wherein the virtual device is to be utilized by a guest that is executed by the electronic device, wherein the plurality of AI instances can be independently assigned to guests via virtual devices to provide I/O device functionality to the guests; emulating device resources of the I/O device via the virtual device; intercepting a request from the guest pertaining to the virtual device; determining whether the request from the guest is a fast-path operation to be passed directly to one of the one or more AI instances of the I/O device or a slow-path operation that is to be at least partially serviced via software executed by the electronic device; and responsive to determining that the request is a slow-path operation, servicing the request at least partially via the software executed by the electronic device instead of passing the request to the I/O device directly from the guest.

In some embodiments, each of the plurality of AI instances correspond to specific backend resources of the I/O device, wherein at least one of the AI instances corresponds to: a transmission/reception (Tx/Rx) queue; a command queue; a Field Programmable Gate Array (FPGA) context; a set of one or more processing units; a Graphics Processing Unit (GPU) context; or a General-purpose computing on graphics processing unit (GPGPU) context. In some embodiments, the emulated device resources comprise a configuration space for the virtual device; the I/O device does not include a hardware configuration space for the one or more AI instances; and the request is to access the configuration space. In some embodiments, the method further comprises: intercepting a second request from the guest; determining whether the second request is a fast-path operation or a slow-path; and responsive to determining that the second request is a fast-path operation, passing the request to the I/O device directly from the guest. In some embodiments, the method further comprises: causing, for each of the one or more AI instances, a memory-mapped I/O (MMIO) region to be implemented as a plurality of system page size regions within a single MMIO hardware region of the I/O device, wherein the plurality of system page size regions are not completely contiguous within the single hardware MMIO region of the I/O device but appear contiguous to the guest, wherein the guest can, for a set of fast-path operations, directly access the plurality of system page size regions of the one or more AI instances without involving an underlying virtual machine manager (VMM). In some embodiments, the method further comprises causing, for each of the one or more AI instances, the MMIO region to further be implemented via one or more system page size regions emulated by the electronic device; intercepting, from the guest, a request to perform a slow-path operation involving the MMIO region; and servicing the request to perform the slow-path operation using the emulated one or more system page size regions. In some embodiments, the MMIO region corresponding to a first of the plurality of AI instances is of a different size than another MMIO region corresponding to a second of the plurality of AI instances. In some embodiments, the I/O device functionality provided by a first of the plurality of AI instances is different than the I/O device functionality provided by a second of the plurality of AI instances. In some embodiments, the method further comprises: receiving, at the electronic device from the I/O device, an interrupt message generated by the I/O device for the guest or the electronic device, wherein the I/O device implements a non-architectural interrupt message storage (IMS) and assigns one or more entries of the IMS to the one or more AI instances for generating interrupts to the guest or the electronic device. In some embodiments, the I/O device selected the interrupt message from the IMS based on an address space identifier (ASID) of one of the one or more AI instances or based upon a command submission address of an I/O command to the AI. In some embodiments, the method further comprises: emulating an interrupt message storage (IMS) for the guest, comprising exposing a virtual message signaled interrupt extended (MSI-x) table or a virtual non-architectural IMS; intercepting, from the guest, a request to write to a virtualized interrupt configuration; and performing the request using the emulated IMS instead of providing the request to the I/O device directly from the guest. In some embodiments, the I/O device hosting function comprises a plurality of AI instances; all of the plurality of AI instances share a same Requester-ID; and each of the plurality of AI instances is assigned a unique address space identifier that is used to distinguish requests from different ones of the plurality of AI instances. In some embodiments, the electronic device provides nested hardware I/O virtualization in that either: the guest is part of a container executing on top of a host that itself is executed by the electronic device; the guest is part of a container executing on top of a first virtual machine (VM) that itself is executing on the electronic device; or the guest is part of a second VM that executes on top of a third VM that itself is executing on the electronic device. In some embodiments, a host and the guest can communicate using a software-based communication technique without any use of a hardware mailbox based technique, wherein the host is executed by the electronic device.

According to some embodiments, a non-transitory machine-readable storage media has instructions which, when executed by one or more processors of an electronic device, cause the electronic device to provide scalable virtualization of an Input/Output (I/O) device coupled with the electronic device and perform operations. The operations comprise composing a virtual device that comprises one or more assignable interface (AI) instances of a plurality of AI instances of a hosting function exposed by the I/O device, wherein the virtual device is to be utilized by a guest that is executed by the electronic device, wherein the plurality of AI instances can be independently assigned to guests via virtual devices to provide I/O device functionality to the guests; emulating device resources of the I/O device via the virtual device; determining whether the request from the guest is a fast-path operation to be passed directly to one of the one or more AI instances of the I/O device or a slow-path operation that is to be at least partially serviced via software executed by the electronic device; and responsive to determining that the request is a slow-path operation, servicing the request at least partially via the software executed by the electronic device instead of passing the request to the I/O device directly from the guest.

In some embodiments, each of the plurality of AI instances correspond to specific backend resources of the I/O device, wherein at least one of the AI instances corresponds to: a transmission/reception (Tx/Rx) queue; a command queue; a Field Programmable Gate Array (FPGA) context; a set of one or more processing units; a Graphics Processing Unit (GPU) context; or a General-purpose computing on graphics processing unit (GPGPU) context. In some embodiments, the emulated device resources comprise a configuration space for the virtual device; the I/O device does not include a hardware configuration space for the one or more AI instances; and the request is to access the configuration space. In some embodiments, the operations further comprise: intercepting a second request from the guest; determining whether the second request is a fast-path operation or a slow-path; and responsive to determining that the second request is a fast-path operation, passing the request to the I/O device directly from the guest. In some embodiments, the operations further comprise: causing, for each of the one or more AI instances, a memory-mapped I/O (MMIO) region to be implemented as a plurality of system page size regions within a single MMIO hardware region of the I/O device, wherein the plurality of system page size regions are not completely contiguous within the single hardware MMIO region of the I/O device but appear contiguous to the guest, wherein the guest can, for a set of fast-path operations, directly access the plurality of system page size regions of the one or more AI instances without involving an underlying virtual machine manager (VMM). In some embodiments, the operations further comprise: causing, for each of the one or more AI instances, the MMIO region to further be implemented via one or more system page size regions emulated by the electronic device; intercepting, from the guest, a request to perform a slow-path operation involving the MMIO region; and servicing the request to perform the slow-path operation using the emulated one or more system page size regions. In some embodiments, the MMIO region corresponding to a first of the plurality of AI instances is of a different size than another MMIO region corresponding to a second of the plurality of AI instances. In some embodiments, the I/O device functionality provided by a first of the plurality of AI instances is different than the I/O device functionality provided by a second of the plurality of AI instances. In some embodiments, the operations further comprise: receiving, from the I/O device, an interrupt message generated by the I/O device for the guest or the electronic device, wherein the I/O device implements a non-architectural interrupt message storage (IMS) and assigns one or more entries of the IMS to the one of more AI instances for generating interrupts to the guest or the electronic device. In some embodiments, the I/O device selected the interrupt message from the IMS based on an address space identifier (ASID) of one of the one or more AI instances or based upon a command submission address of an I/O command to the AI. In some embodiments, the operations further comprise: emulating an interrupt message storage (IMS) for the guest, comprising exposing a virtual message signaled interrupt extended (MSI-x) table or a virtual non-architectural IMS; intercepting, from the guest, a request to write to a virtualized interrupt configuration; and performing the request using the emulated IMS instead of providing the request to the I/O device directly from the guest. In some embodiments, the operations further comprise: the I/O device hosting function comprises a plurality of AI instances; all of the plurality of AI instances share a same Requester-ID; and each of the plurality of AI instances is assigned a unique address space identifier that is used to distinguish requests from different ones of the plurality of AI instances. In some embodiments, the electronic device provides nested hardware I/O virtualization in that either: the guest is part of a container executing on top of a host that itself is executed by the electronic device; the guest is part of a container executing on top of a first virtual machine (VM) that itself is executing on the electronic device; or the guest is part of a second VM that executes on top of a third VM that itself is executing on the electronic device. In some embodiments, a host and the guest can communicate using a software-based communication technique without any use of a hardware mailbox based technique, wherein the host is executed by the electronic device.

According to some embodiments, an electronic device comprises: a Peripheral Component Interconnect Express (PCIe) interface to couple an Input/Output (I/O) device with the electronic device; one or more processors; and a non-transitory machine-readable storage media having instructions which, when executed by the one or more processors, cause the electronic device to compose a virtual device that comprises one or more assignable interface (AI) instances of a plurality of AI instances of a hosting function exposed by the I/O device, wherein the virtual device is to be utilized by a guest that is executed by the electronic device, wherein the plurality of AI instances can be independently assigned to guests via virtual devices to provide I/O device functionality to the guests; emulate device resources of the I/O device via the virtual device; intercept a request from the guest pertaining to the virtual device; determine whether the request from the guest is a fast-path operation to be passed directly to one of the one or more AI instances of the I/O device or a slow-path operation that is to be at least partially serviced via software executed by the electronic device; and responsive to a determination that the request is a slow-path operation, service the request at least partially via the software executed by the electronic device instead of passing the request to the I/O device directly from the guest.

According to some embodiments, a system comprises: an electronic device and an Input/Output (I/O) device. The electronic device comprises a Peripheral Component Interconnect Express (PCIe) interface to physically and communicatively couple the I/O device with the electronic device; one or more processors; and a non-transitory machine-readable storage media having instructions which, when executed by the one or more processors, cause the electronic device to compose a virtual device that comprises one or more assignable interface (AI) instances of a plurality of AI instances of a hosting function exposed by the I/O device, wherein the virtual device is to be utilized by a guest that is executed by the electronic device, wherein the plurality of AI instances can be independently assigned to guests via virtual devices to provide I/O device functionality to the guests; emulate device resources of the I/O device via the virtual device; intercept a request from the guest pertaining to the virtual device; determine whether the request from the guest is a fast-path operation to be passed directly to one of the one or more AI instances of the I/O device or a slow-path operation that is to be at least partially serviced via software executed by the electronic device; and responsive to a determination that the request is a slow-path operation, service the request at least partially via the software executed by the electronic device instead of passing the request to the I/O device directly from the guest. The I/O device comprises a physical interface that physically and communicatively couples the I/O device with the PCIe interface of the electronic device.

In yet another embodiment, an apparatus comprises a data storage device that stores code that when executed by a hardware processor causes the hardware processor to perform any method disclosed herein. An apparatus may be as described in the detailed description. A method may be as described in the detailed description. In another embodiment, a non-transitory machine-readable medium stores code that when executed by a machine causes the machine to perform a method comprising any method disclosed herein.

Embodiments disclosed herein utilize electronic devices. An electronic device can store and transmit (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (i.e., when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Some electronic devices also include a set or one or more physical network interface(s) to establish network connections (to transmit and/or receive code and/or data using propagating signals) with other electronic devices. One or more parts of various embodiments may be implemented using different combinations of software, firmware, and/or hardware.

Instruction Sets

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Register Architecture

Figure 9:
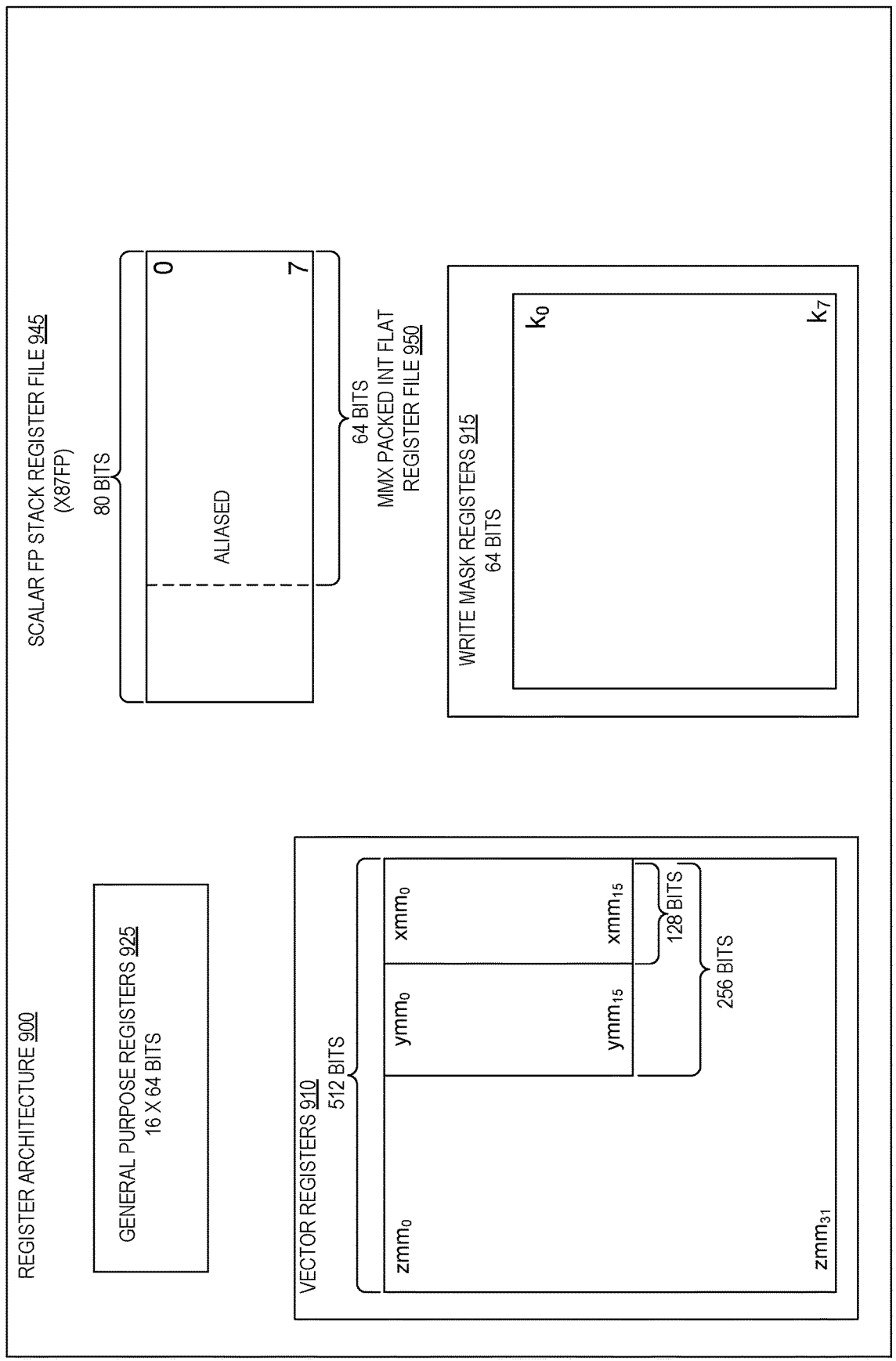
FIG. 9 is a block diagram of a register architecture 900 according to some embodiments.

FIG. 9 is a block diagram of a register architecture 900 according to one embodiment of the invention. In the embodiment illustrated, there are 32 vector registers 910 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15.

Write mask registers 915—in the embodiment illustrated, there are 8 write mask registers (k0 through k7), each 64 bits in size. In an alternate embodiment, the write mask registers 915 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 925—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 945, on which is aliased the MMX packed integer flat register file 950—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 10A is a block diagram illustrating both an exemplary in-order pipeline and an exemplary register renaming, out-of-order issue/execution pipeline according to embodiments of the invention. FIG. 10B is a block diagram illustrating both an exemplary embodiment of an in-order architecture core and an exemplary register renaming, out-of-order issue/execution architecture core to be included in a processor according to embodiments of the invention. The solid lined boxes in FIGS. 10A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 10A, a processor pipeline 1000 includes a fetch stage 1002, a length decode stage 1004, a decode stage 1006, an allocation stage 1008, a renaming stage 1010, a scheduling (also known as a dispatch or issue) stage 1012, a register read/memory read stage 1014, an execute stage 1016, a write back/memory write stage 1018, an exception handling stage 1022, and a commit stage 1024.

FIG. 10B shows processor core 1090 including a front end unit 1030 coupled to an execution engine unit 1050, and both are coupled to a memory unit 1070. The core 1090 may be a reduced instruction set computing (RISC) core, a complex instruction set computing (CISC) core, a very long instruction word (VLIW) core, or a hybrid or alternative core type. As yet another option, the core 1090 may be a special-purpose core, such as, for example, a network or communication core, compression engine, coprocessor core, general purpose computing graphics processing unit (GPGPU) core, graphics core, or the like.

The front end unit 1030 includes a branch prediction unit 1032 coupled to an instruction cache unit 1034, which is coupled to an instruction translation lookaside buffer (TLB) 1036, which is coupled to an instruction fetch unit 1038, which is coupled to a decode unit 1040. The decode unit 1040 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1040 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1090 includes a microcode ROM or other medium that stores microcode for certain macroinstructions (e.g., in decode unit 1040 or otherwise within the front end unit 1030). The decode unit 1040 is coupled to a rename/allocator unit 1052 in the execution engine unit 1050.

The execution engine unit 1050 includes the rename/allocator unit 1052 coupled to a retirement unit 1054 and a set of one or more scheduler unit(s) 1056. The scheduler unit(s) 1056 represents any number of different schedulers, including reservations stations, central instruction window, etc. The scheduler unit(s) 1056 is coupled to the physical register file(s) unit 1058. Each of the physical register file(s) units 1058 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1058 comprises a vector registers unit, a write mask registers unit, and a scalar registers unit. These register units may provide architectural vector registers, vector mask registers, and general purpose registers. The physical register file(s) unit(s) 1058 is overlapped by the retirement unit 1054 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1054 and the physical register file(s) unit(s) 1058 are coupled to the execution cluster(s) 1060. The execution cluster(s) 1060 includes a set of one or more execution units 1062 and a set of one or more memory access units 1064. The execution units 1062 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1056, physical register file(s) unit(s) 1058, and execution cluster(s) 1060 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1064). It should also be understood that where separate pipelines are used, one or more of these pipelines may be out-of-order issue/execution and the rest in-order.

The set of memory access units 1064 is coupled to the memory unit 1070, which includes a data TLB unit 1072 coupled to a data cache unit 1074 coupled to a level 2 (L2) cache unit 1076. In one exemplary embodiment, the memory access units 1064 may include a load unit, a store address unit, and a store data unit, each of which is coupled to the data TLB unit 1072 in the memory unit 1070. The instruction cache unit 1034 is further coupled to a level 2 (L2) cache unit 1076 in the memory unit 1070. The L2 cache unit 1076 is coupled to one or more other levels of cache and eventually to a main memory.

By way of example, the exemplary register renaming, out-of-order issue/execution core architecture may implement the pipeline 1000 as follows: 1) the instruction fetch 1038 performs the fetch and length decoding stages 1002 and 1004; 2) the decode unit 1040 performs the decode stage 1006; 3) the rename/allocator unit 1052 performs the allocation stage 1008 and renaming stage 1010; 4) the scheduler unit(s) 1056 performs the schedule stage 1012; 5) the physical register file(s) unit(s) 1058 and the memory unit 1070 perform the register read/memory read stage 1014; the execution cluster 1060 perform the execute stage 1016; 6) the memory unit 1070 and the physical register file(s) unit(s) 1058 perform the write back/memory write stage 1018; 7)

various units may be involved in the exception handling stage 1022; and 8) the retirement unit 1054 and the physical register file(s) unit(s) 1058 perform the commit stage 1024.

The core 1090 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1090 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1034/1074 and a shared L2 cache unit 1076, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 11A:
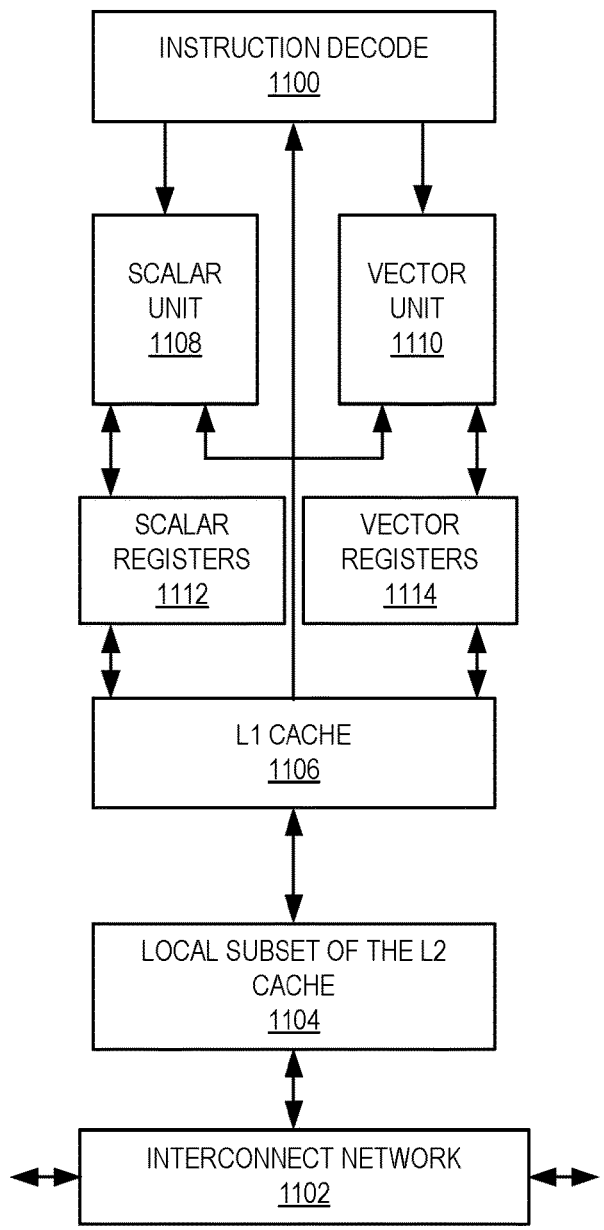
FIGS. 11A-B illustrate a block diagram of a more specific exemplary in-order core architecture, which core would be one of several logic blocks (including other cores of the same type and/or different types) in a chip.
Figure 11B:
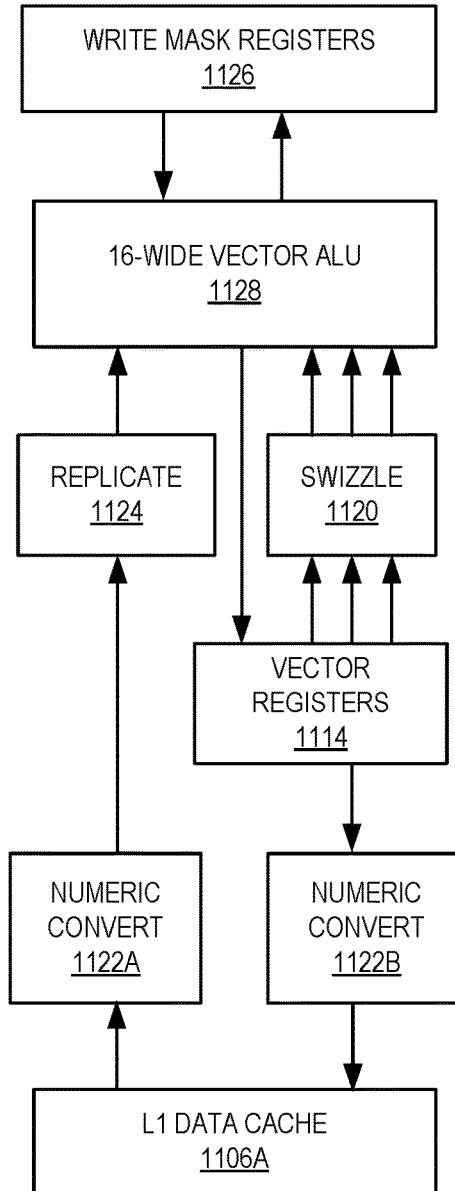

FIGS. 11A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 11A is a block diagram of a single processor core, along with its connection to the on-die interconnect network 1102 and with its local subset of the Level 2 (L2) cache 1104, according to embodiments of the invention. In one embodiment, an instruction decoder 1100 supports the x86 instruction set with a packed data instruction set extension. An L1 cache 1106 allows low-latency accesses to cache memory into the scalar and vector units. While in one embodiment (to simplify the design), a scalar unit 1108 and a vector unit 1110 use separate register sets (respectively, scalar registers 1112 and vector registers 1114) and data transferred between them is written to memory and then read back in from a level 1 (L1) cache 1106, alternative embodiments of the invention may use a different approach (e.g., use a single register set or include a communication path that allow data to be transferred between the two register files without being written and read back).

The local subset of the L2 cache 1104 is part of a global L2 cache that is divided into separate local subsets, one per processor core. Each processor core has a direct access path to its own local subset of the L2 cache 1104. Data read by a processor core is stored in its L2 cache subset 1104 and can be accessed quickly, in parallel with other processor cores accessing their own local L2 cache subsets. Data written by a processor core is stored in its own L2 cache subset 1104 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 11B is an expanded view of part of the processor core in FIG. 11A according to embodiments of the invention. FIG. 11B includes an L1 data cache 1106A part of the L1 cache 1104, as well as more detail regarding the vector unit 1110 and the vector registers 1114. Specifically, the vector unit 1110 is a 16-wide vector processing unit (VPU) (see the 16-wide ALU 1128), which executes one or more of integer, single-precision float, and double-precision float instructions. The VPU supports swizzling the register inputs with swizzle unit 1120, numeric conversion with numeric convert units 1122A-B, and replication with replication unit 1124 on the memory input. Write mask registers 1126 allow predicating resulting vector writes.

Figure 12:
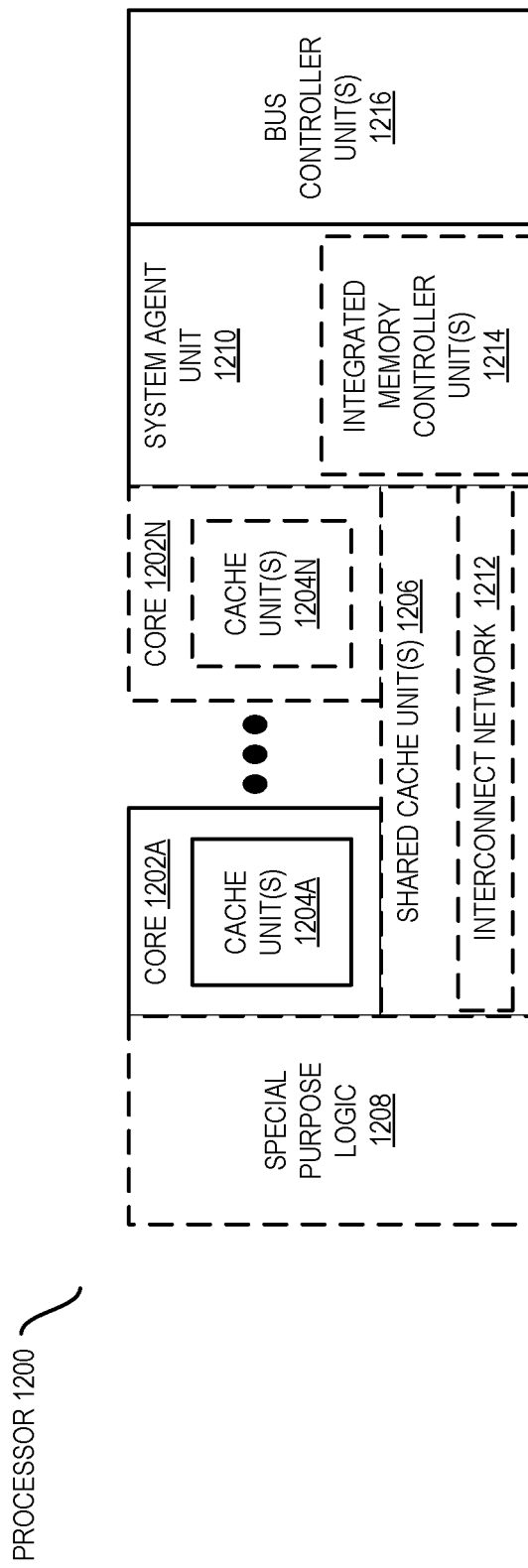
FIG. 12 is a block diagram of a processor 1200 that may have more than one core, may have an integrated memory controller, and may have integrated graphics according to some embodiments.

FIG. 12 is a block diagram of a processor 1200 that may have more than one core, may have an integrated memory controller, and may have integrated graphics according to embodiments of the invention. The solid lined boxes in FIG. 12 illustrate a processor 1200 with a single core 1202A, a system agent 1210, a set of one or more bus controller units 1216, while the optional addition of the dashed lined boxes illustrates an alternative processor 1200 with multiple cores 1202A-N, a set of one or more integrated memory controller unit(s) 1214 in the system agent unit 1210, and special purpose logic 1208.

Thus, different implementations of the processor 1200 may include: 1) a CPU with the special purpose logic 1208 being integrated graphics and/or scientific (throughput) logic (which may include one or more cores), and the cores 1202A-N being one or more general purpose cores (e.g., general purpose in-order cores, general purpose out-of-order cores, a combination of the two); 2) a coprocessor with the cores 1202A-N being a large number of special purpose cores intended primarily for graphics and/or scientific (throughput); and 3) a coprocessor with the cores 1202A-N being a large number of general purpose in-order cores. Thus, the processor 1200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1206, and external memory (not shown) coupled to the set of integrated memory controller units 1214. The set of shared cache units 1206 may include one or more mid-level caches, such as level 2 (L2), level 3 (L3), level 4 (L4), or other levels of cache, a last level cache (LLC), and/or combinations thereof. While in one embodiment a ring based interconnect unit 1212 interconnects the special purpose logic 1208 (e.g., integrated graphics logic), the set of shared cache units 1206, and the system agent unit 1210/ integrated memory controller unit(s) 1214, alternative embodiments may use any number of well-known techniques for interconnecting such units. In one embodiment, coherency is maintained between one or more cache units 1206 and cores 1202-A-N.

In some embodiments, one or more of the cores 1202A-N are capable of multi-threading. The system agent 1210 includes those components coordinating and operating cores 1202A-N. The system agent unit 1210 may include for example a power control unit (PCU) and a display unit. The PCU may be or include logic and components needed for regulating the power state of the cores 1202A-N and the integrated graphics logic 1208. The display unit is for driving one or more externally connected displays.

The cores 1202A-N may be homogenous or heterogeneous in terms of architecture instruction set; that is, two or more of the cores 1202A-N may be capable of execution the same instruction set, while others may be capable of executing only a subset of that instruction set or a different instruction set.

Exemplary Computer Architectures

FIGS. 13-16 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 13:
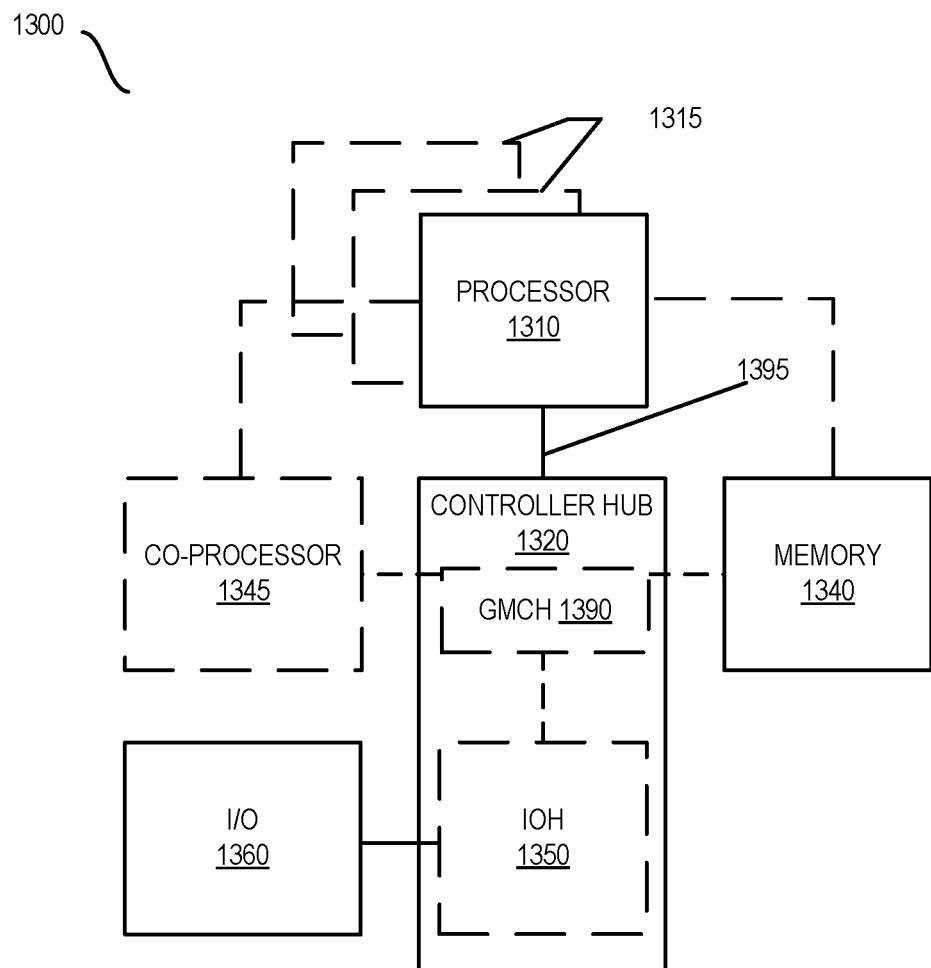

Referring now to FIG. 13, shown is a block diagram of a system 1300 in accordance with one embodiment of the present invention. The system 1300 may include one or more processors 1310, 1315, which are coupled to a controller hub 1320. In one embodiment the controller hub 1320 includes a graphics memory controller hub (GMCH) 1390 and an Input/Output Hub (IOH) 1350 (which may be on separate chips); the GMCH 1390 includes memory and graphics controllers to which are coupled memory 1340 and a coprocessor 1345; the IOH 1350 couples input/output (I/O) devices 1360 to the GMCH 1390. Alternatively, one or both of the memory and graphics controllers are integrated within the processor (as described herein), the memory 1340 and the coprocessor 1345 are coupled directly to the processor 1310, and the controller hub 1320 in a single chip with the IOH 1350.

The optional nature of additional processors 1315 is denoted in FIG. 13 with broken lines. Each processor 1310, 1315 may include one or more of the processing cores described herein and may be some version of the processor 1200.

The memory 1340 may be, for example, dynamic random access memory (DRAM), phase change memory (PCM), or a combination of the two. For at least one embodiment, the controller hub 1320 communicates with the processor(s) 1310, 1315 via a multi-drop bus, such as a frontside bus (FSB), point-to-point interface such as QuickPath Interconnect (QPI), or similar connection 1395.

In one embodiment, the coprocessor 1345 is a special-purpose processor, such as, for example, a high-throughput MIC processor, a network or communication processor, compression engine, graphics processor, GPGPU, embedded processor, or the like. In one embodiment, controller hub 1320 may include an integrated graphics accelerator.

There can be a variety of differences between the physical resources 1310, 1315 in terms of a spectrum of metrics of merit including architectural, microarchitectural, thermal, power consumption characteristics, and the like.

In one embodiment, the processor 1310 executes instructions that control data processing operations of a general type. Embedded within the instructions may be coprocessor instructions. The processor 1310 recognizes these coprocessor instructions as being of a type that should be executed by the attached coprocessor 1345. Accordingly, the processor 1310 issues these coprocessor instructions (or control signals representing coprocessor instructions) on a coprocessor bus or other interconnect, to coprocessor 1345. Coprocessor(s) 1345 accept and execute the received coprocessor instructions.

Figure 14:
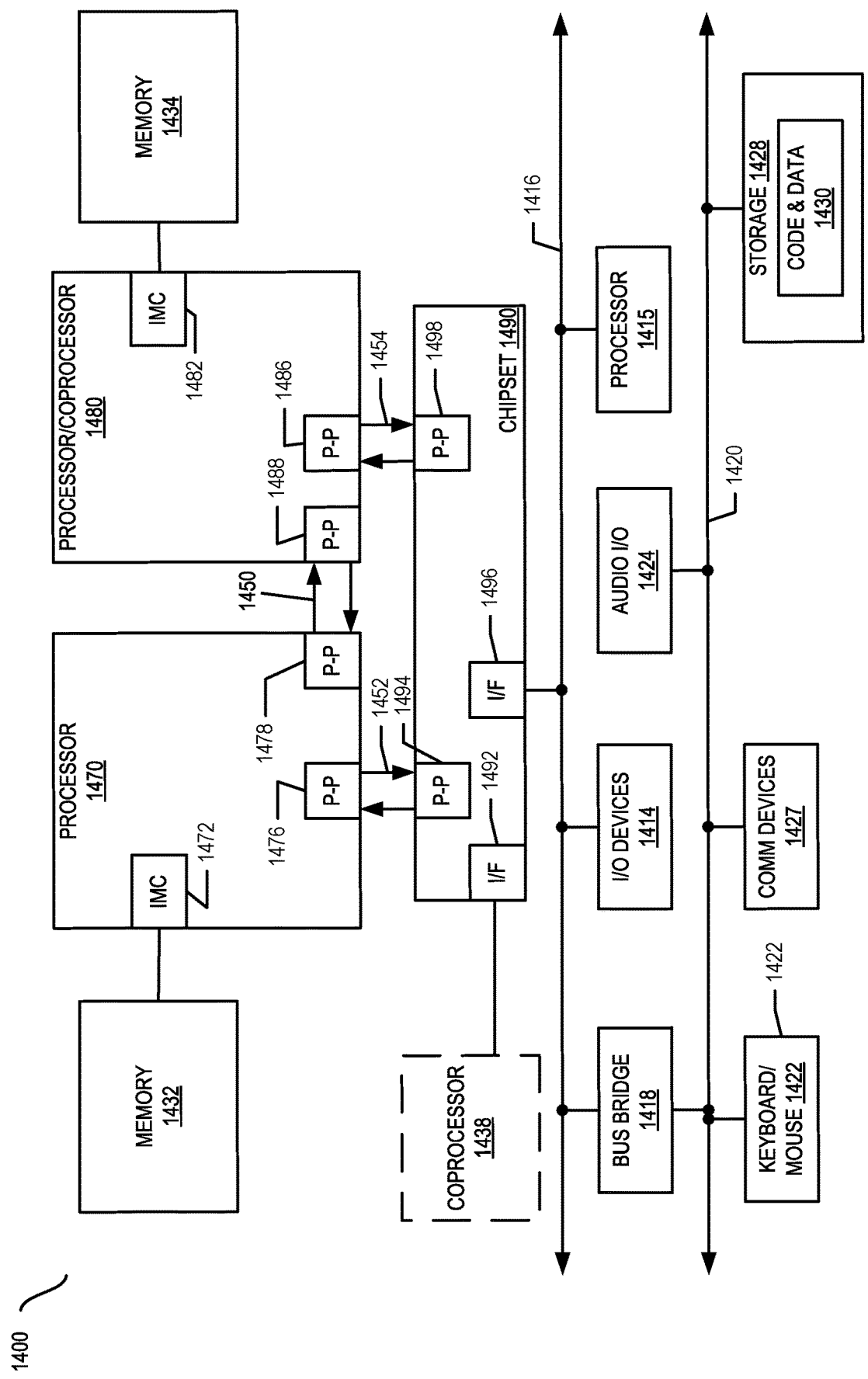

Referring now to FIG. 14, shown is a block diagram of a first more specific exemplary system 1400 in accordance with an embodiment of the present invention. As shown in FIG. 14, multiprocessor system 1400 is a point-to-point interconnect system, and includes a first processor 1470 and a second processor 1480 coupled via a point-to-point interconnect 1450. Each of processors 1470 and 1480 may be some version of the processor 1200. In one embodiment of the invention, processors 1470 and 1480 are respectively processors 1310 and 1315, while coprocessor 1438 is coprocessor 1345. In another embodiment, processors 1470 and 1480 are respectively processor 1310 coprocessor 1345.

Processors 1470 and 1480 are shown including integrated memory controller (IMC) units 1472 and 1482, respectively. Processor 1470 also includes as part of its bus controller units point-to-point (P-P) interfaces 1476 and 1478; similarly, second processor 1480 includes P-P interfaces 1486 and 1488. Processors 1470, 1480 may exchange information via a point-to-point (P-P) interface 1450 using P-P interface circuits 1478, 1488. As shown in FIG. 14, IMCs 1472 and 1482 couple the processors to respective memories, namely a memory 1432 and a memory 1434, which may be portions of main memory locally attached to the respective processors.

Processors 1470, 1480 may each exchange information with a chipset 1490 via individual P-P interfaces 1452, 1454 using point to point interface circuits 1476, 1494, 1486, 1498. Chipset 1490 may optionally exchange information with the coprocessor 1438 via a high-performance interface 1492. In one embodiment, the coprocessor 1438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of the present invention is not so limited.

As shown in FIG. 14, various I/O devices 1414 may be coupled to first bus 1416, along with a bus bridge 1418 which couples first bus 1416 to a second bus 1420. In one embodiment, one or more additional processor(s) 1415, such as coprocessors, high-throughput MIC processors, GPGPU's, accelerators (such as, e.g., graphics accelerators or digital signal processing (DSP) units), field programmable gate arrays, or any other processor, are coupled to first bus 1416. In one embodiment, second bus 1420 may be a low pin count (LPC) bus. Various devices may be coupled to a second bus 1420 including, for example, a keyboard and/or mouse 1422, communication devices 1427 and a storage unit 1428 such as a disk drive or other mass storage device which may include instructions/code and data 1430, in one embodiment. Further, an audio I/O 1424 may be coupled to the second bus 1420. Note that other architectures are possible. For example, instead of the point-to-point architecture of FIG. 14, a system may implement a multi-drop bus or other such architecture.

Figure 15:
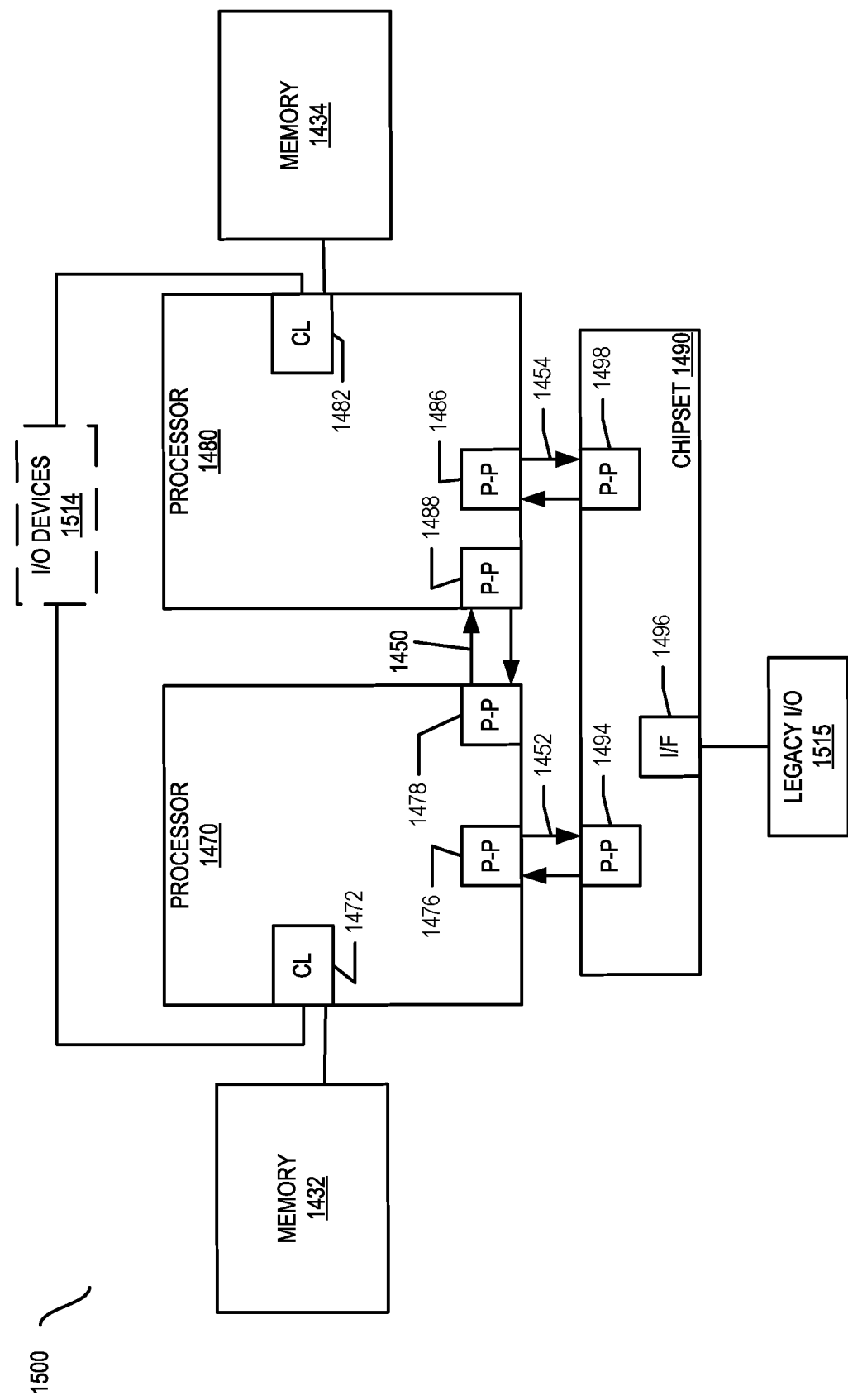

Referring now to FIG. 15, shown is a block diagram of a second more specific exemplary system 1500 in accordance with an embodiment of the present invention. Like elements in FIGS. 14 and 15 bear like reference numerals, and certain aspects of FIG. 14 have been omitted from FIG. 15 in order to avoid obscuring other aspects of FIG. 15.

FIG. 15 illustrates that the processors 1470, 1480 may include integrated memory and I/O control logic ("CL") 1472 and 1482, respectively. Thus, the CL 1472, 1482 include integrated memory controller units and include I/O control logic. FIG. 15 illustrates that not only are the memories 1432, 1434 coupled to the CL 1472, 1482, but also that I/O devices 1514 are also coupled to the control logic 1472, 1482. Legacy I/O devices 1515 are coupled to the chipset 1490.

Figure 16:
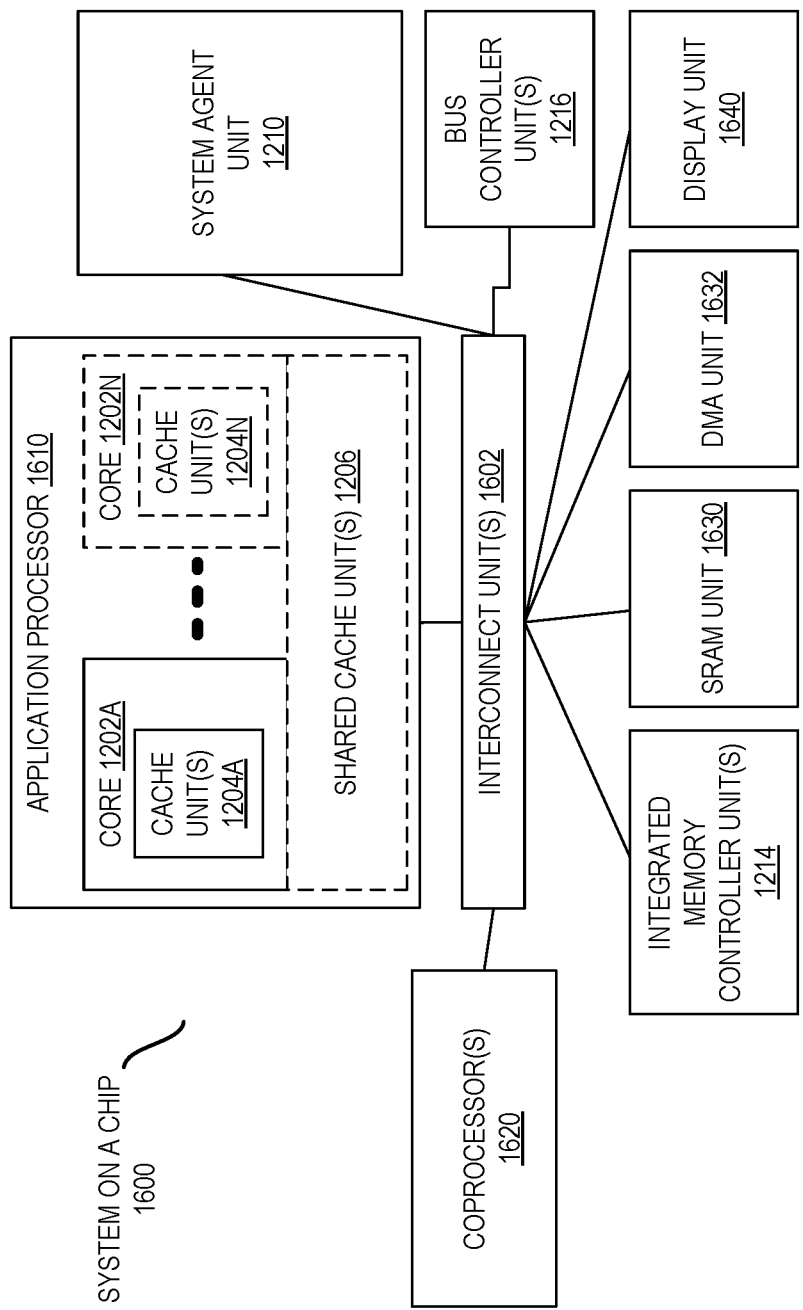

Referring now to FIG. 16, shown is a block diagram of a SoC 1600 in accordance with an embodiment of the present invention. Similar elements in FIG. 12 bear like reference numerals. Also, dashed lined boxes are optional features on more advanced SoCs. In FIG. 16, an interconnect unit(s) 1602 is coupled to: an application processor 1610 which includes a set of one or more cores 1202A-N, which include cache units 1204A-N, and shared cache unit(s) 1206; a system agent unit 1210; a bus controller unit(s) 1216; an integrated memory controller unit(s) 1214; a set or one or more coprocessors 1620 which may include integrated graphics logic, an image processor, an audio processor, and a video processor; an static random access memory (SRAM) unit 1630; a direct memory access (DMA) unit 1632; and a display unit 1640 for coupling to one or more external displays. In one embodiment, the coprocessor(s) 1620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1430 illustrated in FIG. 14, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 17:
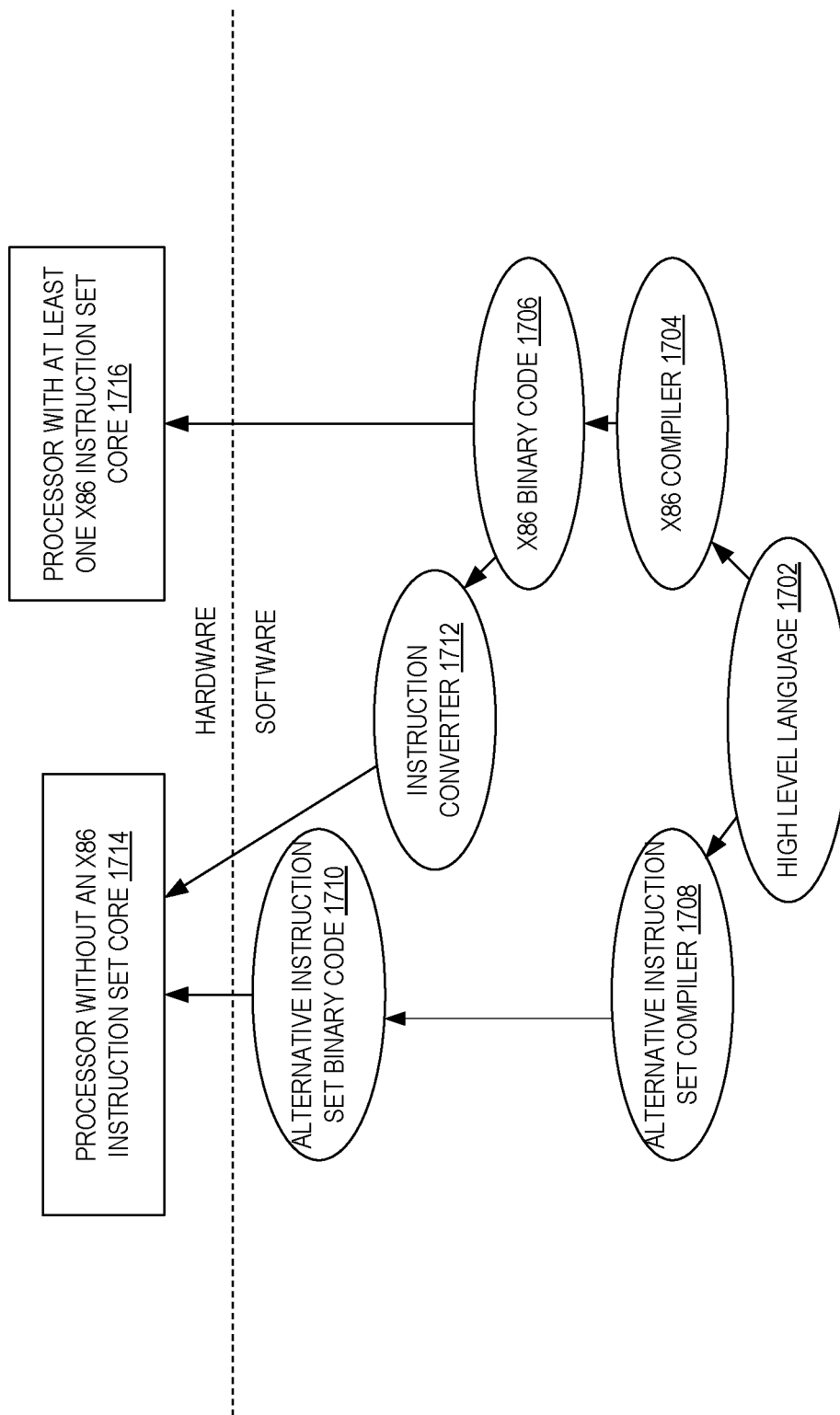
FIG. 17 is a block diagram contrasting the use of a software instruction converter to convert binary instructions in a source instruction set to binary instructions in a target instruction set according to some embodiments.

FIG. 17 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 17 shows a program in a high level language 1702 may be compiled using an x86 compiler 1704 to generate x86 binary code 1706 that may be natively executed by a processor with at least one x86 instruction set core 1716. The processor with at least one x86 instruction set core 1716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1704 represents a compiler that is operable to generate x86 binary code 1706 (e.g., object code) that can, with or without additional linkage processing, be executed on the processor with at least one x86 instruction set core 1716. Similarly, FIG. 17 shows the program in the high level language 1702 may be compiled using an alternative instruction set compiler 1708 to generate alternative instruction set binary code 1710 that may be natively executed by a processor without at least one x86 instruction set core 1714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1712 is used to convert the x86 binary code 1706 into code that may be natively executed by the processor without an x86 instruction set core 1714. This converted code is not likely to be the same as the alternative instruction set binary code 1710 because an instruction converter capable of this is difficult to make; however, the converted code will accomplish the general operation and be made up of instructions from the alternative instruction set. Thus, the instruction converter 1712 represents software, firmware, hardware, or a combination thereof that, through emulation, simulation or any other process, allows a processor or other electronic device that does not have an x86 instruction set processor or core to execute the x86 binary code 1706.

Though the flow diagrams in the figures show a particular order of operations performed by certain embodiments, it should be understood that such order is exemplary. Thus, alternative embodiments may perform the operations in a different order, combine certain operations, overlap certain operations, etc.

Additionally, although the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

The invention claimed is:

1. An apparatus comprising:
a plurality of backend resources; and
one or more physical function base address registers (PF-BARs) to store one or more base addresses of one or more address ranges to be mapped to a plurality of memory-mapped input/output (MMIO) registers, including a first MMIO register to be accessed for a direct-path operation and a second MMIO register to be accessed for an intercepted-path operation; wherein hardware is to provide guest physical address to host physical address translation for the first MMIO register but not for the second MMIO register;
access for the direct-path operation is to be mapped by a virtual machine monitor (VMM) to an interface for a virtual device, the interface to be composed of one or more of the plurality of backend resources and to be identified by a process address-space identifier (PASID); and
access for the intercepted-path operation is to be intercepted by the VMM for emulation.

2. The apparatus of claim 1, wherein the one or more PF-BARs includes a plurality of variable size PF-BARs.

3. The apparatus of claim 1, wherein the one or more PF-BARs includes a plurality of non-contiguous PF-BARs.

4. The apparatus of claim 1, wherein the one or more PF-BARs include at least one Peripheral Component Interconnect Express (PCIe) base address register.

5. The apparatus of claim 1, wherein the access for the intercepted-path operation is to be intercepted by the VMM for emulation of a configuration space of the virtual device.

6. The apparatus of claim 1, wherein the plurality of backend resources includes at least one of a transmission/reception (Tx/Rx) queue, a command queue, a Field Programmable Gate Array (FPGA) context, a set of one or more processing units, a Graphics Processing Unit (GPU) context, and a general-purpose computing on graphics processing unit (GPGPU) context.

7. A method comprising:
storing, in one or more physical function base address registers (PF-BARs), one or more base addresses of one or more address ranges to be mapped to a plurality of memory-mapped input/output (MMIO) registers, including a first MMIO register to be accessed for a direct-path operation and a second MMIO register to be accessed for an intercepted-path operation;
performing, by hardware, guest physical address to host physical address translation for the first MMIO register but not for the second MMIO register;
mapping, by a virtual machine monitor (VMM), access for the direct-path operation to an interface for a virtual device, the interface to be composed of one or more of a plurality of backend resources and to be identified by a process address-space identifier (PASID); and
intercepting, by the VMM, access for the intercepted-path operation for emulation.

8. The method of claim 7, wherein the one or more PF-BARs includes a plurality of variable size PF-BARs.

9. The method of claim 7, wherein the one or more PF-BARs includes a plurality of non-contiguous PF-BARs.

10. The method of claim 7, wherein the one or more PF-BARs include at least one Peripheral Component Interconnect Express (PCIe) base address register.

11. The method of claim 7, wherein the access for the intercepted-path operation is to be intercepted by the VMM for emulation of a configuration space of the virtual device.

12. The method of claim 7, wherein the plurality of backend resources includes at least one of a transmission/reception (Tx/Rx) queue, a command queue, a Field Programmable Gate Array (FPGA) context, a set of one or more processing units, a Graphics Processing Unit (GPU) context, and a general-purpose computing on graphics processing unit (GPGPU) context.

13. A non-transitory machine-readable medium storing instructions, which when executed by a machine, cause the machine to perform a method comprising:
storing, in one or more physical function base address registers (PF-BARs), one or more base addresses of one or more address ranges to be mapped to a plurality of memory-mapped input/output (MMIO) registers, including a first MMIO register to be accessed for a direct-path operation and a second MMIO register to be accessed for an intercepted-path operation;
performing, by hardware, guest physical address to host physical address translation for the first MMIO register but not for the second MMIO register;
mapping, by a virtual machine monitor (VMM), access for the direct-path operation to an interface for a virtual device, the interface to be composed of one or more of a plurality of backend resources and to be identified by a process address-space identifier (PASID); and intercepting, by the VMM, access for the intercepted-path operation for emulation.

14. The non-transitory machine-readable medium of claim 13, wherein the one or more PF-BARs includes a plurality of variable size PF-BARs.

15. The non-transitory machine-readable medium of claim 13, wherein the one or more PF-BARs includes a plurality of non-contiguous PF-BARs.

16. The non-transitory machine-readable medium of claim 13, wherein the one or more PF-BARs include at least one Peripheral Component Interconnect Express (PCIe) base address register.

17. The non-transitory machine-readable medium of claim 13, wherein the access for the intercepted-path operation is to be intercepted by the VMM for emulation of a configuration space of the virtual device.

18. The non-transitory machine-readable medium of claim 13, wherein the plurality of backend resources includes at least one of a transmission/reception (Tx/Rx) queue, a command queue, a Field Programmable Gate Array (FPGA) context, a set of one or more processing units, a Graphics Processing Unit (GPU) context, and a general-purpose computing on graphics processing unit (GPGPU) context.

* * * * *